United States Patent
Ortega, III et al.

(10) Patent No.: US 6,952,743 B2
(45) Date of Patent: Oct. 4, 2005

(54) INTERFACE FOR DISTRIBUTED PROCESSING OF SCSI TASKS

(75) Inventors: William M. Ortega, III, Tucker, GA (US); Edward S. Quicksall, Ponte Vedre Beach, FL (US)

(73) Assignee: iVivity, Inc.

(*) Notice: Subject to any disclaimer, the term of this patent is extended or adjusted under 35 U.S.C. 154(b) by 0 days.

(21) Appl. No.: 10/794,694

(22) Filed: Mar. 5, 2004

(65) Prior Publication Data

US 2004/0221070 A1 Nov. 4, 2004

Related U.S. Application Data

(60) Provisional application No. 60/453,478, filed on Mar. 7, 2003.

(51) Int. Cl.[7] .......................... G06F 3/00; G06F 13/28; G06F 13/14; G06F 13/00; G06F 15/16
(52) U.S. Cl. .............................. 710/5; 710/6; 710/29; 710/37; 710/38; 709/230; 709/236; 709/238
(58) Field of Search ..................... 710/3–6, 29, 33–38, 710/62; 709/201, 250, 217–231, 239–246, 214; 370/401

(56) References Cited

U.S. PATENT DOCUMENTS

| | | | | |
|---|---|---|---|---|
| 6,683,883 B1 | * | 1/2004 | Czeiger et al. | 370/401 |
| 6,886,086 B2 | * | 4/2005 | Kobayashi et al. | 709/214 |
| 2004/0019686 A1 | * | 1/2004 | Toyoda et al. | 709/229 |
| 2004/0148376 A1 | * | 7/2004 | Rangan et al. | 710/5 |

* cited by examiner

*Primary Examiner*—Kim Huynh
*Assistant Examiner*—Joshua D. Schneider
(74) *Attorney, Agent, or Firm*—Brian Anderson

(57) ABSTRACT

The SCSI control block interface provides for distributed processing of storage commands that provides transports and processing blocks the ability to interconnect with each other independent of the underlying transport or hardware architecture. The interface receives a SCSI control block from a transport and determines a storage command associated with the SCSI control block. Based upon the storage command, a particular processor that processes the storage command is determined. The SCSI control block is routed to the appropriate processor for processing. After processing, the SCB is routed to a transport for delivery.

17 Claims, 24 Drawing Sheets

INTERFACE CONTROL STRUCTURE (SCB)

INTERFACE CONTROL STRUCTURE (TMF)

INTERFACE RESPONSE STRUCTURE (SCB)

INTERFACE RESPONSE STRUCTURE (TMF)

PROCESSING CONTROL STRUCTURE (SCB)

PROCESSING CONTROL STRUCTURE (TMF)

PROCESSING RESPONSE STRUCTURE (SCB)

PROCESSING RESPONSE STRUCTURE (TMF)

CONTROL BLOCK STRUCTURE (DOCB)

CONTROL BLOCK STRUCTURE (DICB)

| Bit position | | | | | |
|---|---|---|---|---|---|
| 31    24 | 23    16 | 15    8 | 7    0 | |
| ppcb | elementLength | | | 0 |
| elementAddress | | | | 1 |
| ... | | | | Word |
| ppcb | elementLength | | | m |
| elementAddress | | | | m+1 |

SCATTER-GATHER LIST

FIG. 20

| Bit position | | | | | |
|---|---|---|---|---|---|
| 31  24 | 23  16 | 15  8 | 7  0 | Word |
| virtDisk | ordqd | ordHoq | qid | 0 |
| allocBuffer  aca  untagged | | | receiveHandle | 1 |
| queueFrozen | | count | | 2 |
| head | | | | 3 |
| tail | | | | 4 |

ROUTING TABLE ENTRY

*FIG. 21*

| Bit position | | | | | | | | |
|---|---|---|---|---|---|---|---|---|
| 31 | 24 | 23 | 16 | 15 | 8 | 7 | 0 | |
| cmdCallback ||||||||  0 |
| receiveCmd ||||||||  1 |
| receiveTmf ||||||||  2 |
| genCallback ||||||||  3 |

Word

INTERFACE LIST ENTRY

FIG. 22

| Bit position | | | | | | | |
|---|---|---|---|---|---|---|---|
| 31 | 24 | 23 | 16 | 15 | 8 | 7 | 0 | |
| nextTargetLu |||||||| 0 |
| prevTargetLu ||||||| tst | 1 |
| target ||| vdld || rdy || 2 |
| qerr ||||| lun | virtDisk || 3 |
| unitAttentionCondition ||| qid |||| 4 |
| unitAttentionPending |||| uaInterlock |||| 5 |
| initiatorFaultList |||||| tas || 6 |
| stateList |||||| allocBuffer || 7 |
| acaTaskPending |||||||| 8 |
| acaTask |||||||| 9 |
| |||||||| 18 |
| acaTaskTail |||||||| 19 |
| |||||||| 28 |
| |||||||| 29 |
| capacity |||||||| 30 |
| |||||||| 31 |
| vendorId |||||||| 32 |
| productId |||||||| 33 |
| |||||||| 36 |
| productRev |||||||| 37 |
| resInitiatorHndl |||||||| 38 |

LOGICAL UNIT BLOCK

FIG. 23

| Bit position | | | | | | |
|---|---|---|---|---|---|---|
| 31    24 | 23    16 | 15    8 | 7    0 | Word | | |
| numEntries | | | | 0 | | |
| handle | | | qid | 1 | | |
| vdId | | virtDisk | | 2 | | |
| size | | allocBuffer | | 3 | | |
| ... | | | | | | |
| vdId | | | | m | | |
| size | | | | m+1 | | |

VIRTUAL DEVICE LIST ENTRY

FIG. 24

INTERFACE FOR DISTRIBUTED PROCESSING OF SCSI TASKS

CROSS REFERENCE TO RELATED APPLICATIONS

This application claims priority to the U.S. provisional application Ser. No. 60/453,478 entitled "Interface Between SCSI Transport Process and Blocks" filed Mar. 7, 2003, which is incorporated in its entirety by reference.

TECHNICAL FIELD

The invention relates generally to the field of network storage, and more particularly, to distributed processing of Small Computer System Interface (SCSI) tasks.

BACKGROUND OF THE INVENTION

During the past twenty years, the data storage market has been characterized by a rush towards collaborative computing. With its focus on centralized storage, this collaborative computing trend has created an enormous market for various types of storage and storage management applications.

Beginning with the first local area network (LAN), the basic need to share data and files between computers on a LAN led to direct attached storage (DAS). As networks increased in complexity and scalability, applications evolved to make use of the additional capacity. Applications were able to support dozens and even hundreds of users. As networks scaled, applications became separated from their physical storage and data by distance. As a result, deployment of network attached storage (NAS) became commonplace and for the first time allowed files to be shared by simultaneous users on the network. More recently, the demand for ever-increasing storage capacity across heterogeneous networks has led to the advent of storage area networks (SANs).

SANs introduce a layer of storage management software that plays a vital role in administering distributed IT assets, maintaining high availability, and minimizing downtime. The appeal of the SAN architecture is that effective management of resources from the data center across the network reduces cost and increases both productivity and revenue. SANs and similar data storage solutions require implementation of data storage management tasks or functions such as storage space allocation, storage virtualization, cache management, fault tolerance and recovery, management of RAID arrays, and numerous other functions.

As LANs, wide area networks (WANs), and NAS evolved into the first SANs, network managers were determined to improve the character of storage data management. The first attempt at creating a SAN was to place specialized management appliances between the applications and the storage devices on the network. This method was initially appealing because it afforded immediate control over the data stream. The practice of placing storage management appliances in the data path became known as "in-band architecture". However, as more SANs were deployed it became apparent that the costs and complexity of this architectural scheme were enormous. These factors were initially responsible for minimal use of SANs in all but the biggest enterprises.

Traditionally SANs required a separate dedicated infrastructure to interconnect applications and storage systems. The primary means for these interconnections were Fibre Channel (FC) networks that provided the transport layer for providing storage commands. Storage devices generally use Small Computer System Interface (SCSI) protocol as the standard protocol for processing storage commands. SCSI enables block data transfer between the applications and peripheral devices. SCSI connects initiators, which issue commands, to targets that respond to commands. Typically, the initiators are application clients, and targets are storage subsystems and disk drives. The SCSI architecture is described in SCSI Architectural Model-2 (SAM-2) being propagated by the International Committee for Information Technology Standards (INCITS), incorporated by reference herein in its entirety.

The SCSI protocol defines a logical unit within the target to execute a command. A target typically has multiple logical units distinguished by their logical unit numbers (LUNs). SCSI initiators use a structure known as a command descriptor block (CDB) to send commands, such as read a specific number of blocks. The SCSI protocol refers to a linked set of operations as a task. Examples of SCSI tasks include a read command, a write command, and an inquiry command, just to list a few. Storage management devices have been designed to process SCSI tasks and perform storage operations, such as RAID or storage virtualization and then deliver commands to physical devices. A Front End Transport (FET) receives SCSI commands using a transport specific protocol. A Back End Transport (BET) issues SCSI commands using the same or different transport specific protocol. A processing block processes tasks presented via one or more FETs and issues tasks to one or more BETs. There is no relationship as to the number of FETs, processing blocks and BETs. For example, more than one FET, each supporting a different transport protocol, can supply tasks to one or more processing blocks, each supporting a different application, and one or more BET can receive tasks from a processing block.

The SCSI command structure is well understood and supported by drives and operating systems. As a result, the SCSI command set has become the dominant protocol for disks, tape storage, and storage device management. The primary SCSI commands are described in SCSI Primary Commands-2 (SPC-2) being propagated by INCITS, incorporated by reference herein in its entirety. The device-type specific command sets are also propagated by INCITS.

The industry responded to the cost and architectural complexity associated with fibre channel by attempting to manage storage allocation and virtualization in software running on a separate, common, network topology referred to as Ethernet. Traditionally, this approach required an application to be running on each host and on each storage device. This practice is known as "out-of-band architecture". Unfortunately, this approach offers only a slight improvement because it reduces overall data throughput and introduces unacceptable network latencies.

There have been a multitude of challenges associated with the various implementations of SANs. Most notably, the SANs presently available suffer from high implementation cost, poor performance and high added latency, lower mean time between failures, and high power dissipation, primarily due to implementation with multiple and dispersed circuit components and boards.

A typical SAN appliance sits in the storage data path and introduces undesirable latency. With the increased usage of IP-based storage solutions, a storage appliance has to process storage-over-IP commands and related messages. As the network link speed increases, the overhead associated with processing of storage and task management functions becomes prohibitively slow.

Accordingly, there is a need for improved performance of systems and circuits that effect data storage management functions. There is a need for an improved architecture that allows data flow in data storage applications to be processed at or near the wire speeds of the data interfaces of data storage devices or appliances.

A desirable solution would allow distributed processing of storage commands such that read and write functions can be performed extremely quickly while other time consuming processes can be off loaded to other processors, if available. However, developing a distributed processing system for each possible hardware architecture or transport protocol would be inefficient and costly. Needed is an a interface for distributed processing that provides the ability to interconnect SCSI processing modules independent of the underlying transport or hardware architecture.

SUMMARY OF THE INVENTION

The present interface provides for distributed processing of storage commands within a storage application device that provides transports and processing blocks the ability to interconnect with each other independent of the underlying transport or hardware architecture.

The interface receives a SCSI control block from a front end transport and determines a storage command associated with the SCSI control block. Based upon the storage command, a particular processor that processes the storage command is determined. The storage application device may include multiple processors. Accordingly, more than one processor may be operable for processing storage commands. A user selects the configuration and determines which processor executes which storage applications. Furthermore, more than one processor may be tasked with processing SCSI commands or task management functions. The user can select which storage commands, SCSI commands or task management functions, are to be processed by which processor. The SCSI control block is routed to the appropriate processor for processing of the storage command. After processing, the SCB is routed to a transport for delivery across a network.

BRIEF DESCRIPTION OF THE DRAWINGS

Benefits and further features of the present invention will be apparent from a detailed description of preferred embodiment thereof taken in conjunction with the following drawings, wherein like elements are referred to with like reference numbers, and wherein:

FIG. 20 is a data structure illustrating an exemplary scatter-gather list.

FIG. 21 is a data structure illustrating an exemplary routing table entry.

FIG. 22 is a data structure illustrating an exemplary interface list entry.

FIG. 23 is a data structure illustrating an exemplary logical unit block.

FIG. 24 is a data structure illustrating an exemplary virtual device list entry.

DETAILED DESCRIPTION OF THE EMBODIMENTS

Figure 1:
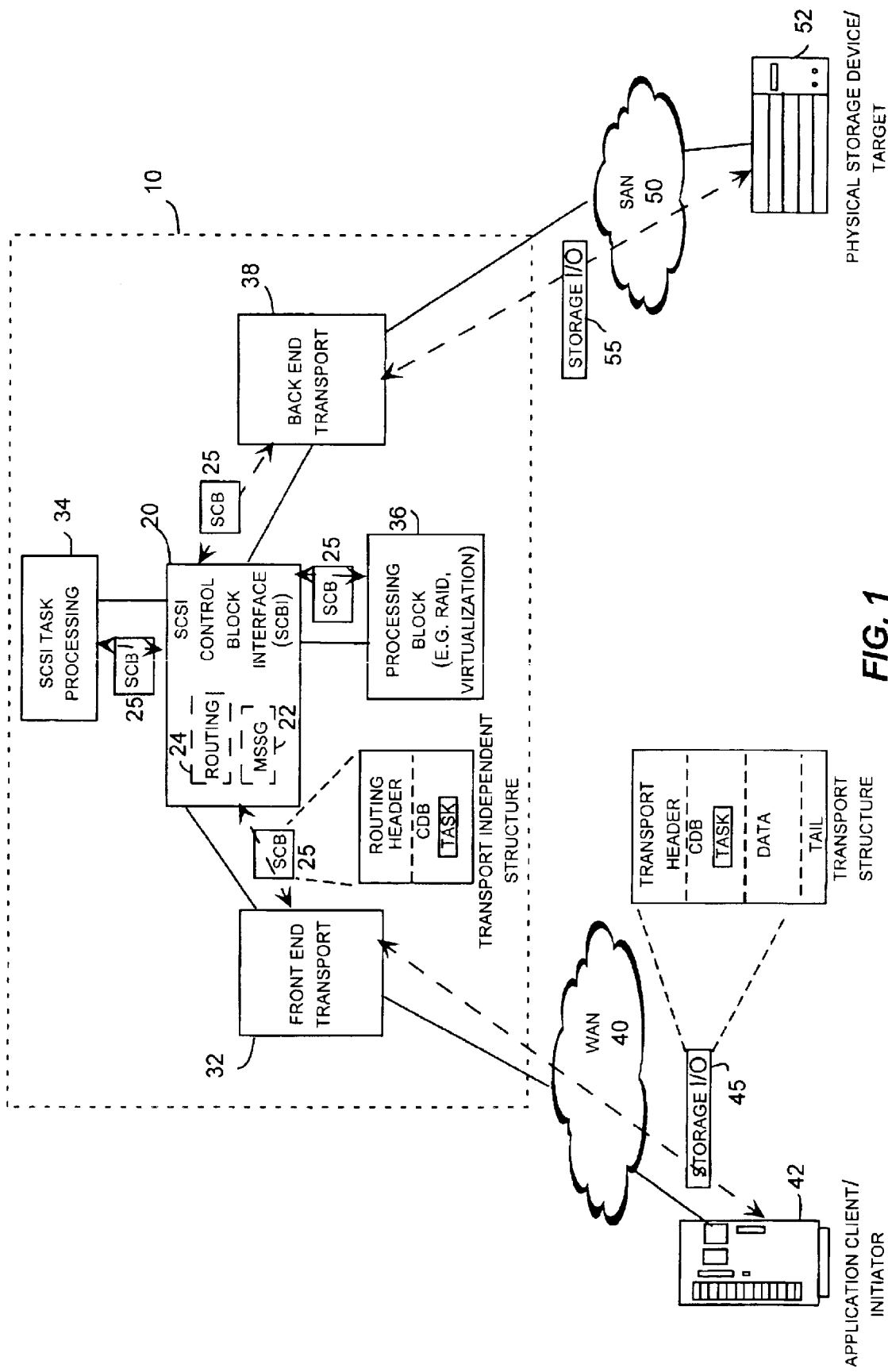
FIG. 1 is a functional block diagram illustrating an overview of a system using an exemplary SCSI control block interface.

The embodiments described herein include aspects of an application program interface (API) within a storage application device that provides front end transports (FETs), storage input/output data (I/O) processing blocks, and back end transports (BETs) the ability to interconnect with each other independent of the underlying transport or hardware architecture. The API and associated called and response functions handle the routing issues between these modules that receive, process, and deliver the storage I/O. These functions that route the storage control blocks between the modules within a storage application device are referred to as SCSI control block interface (SCBI). Knowledge of the underlying routing implementation is not required by the modules to perform their functions.

The SCSI control block interface (SCBI) provides a method to pass SCSI commands and task management functions between transports and processing blocks without the need for modules to have knowledge of the protocols used by other modules. Instead, only interface calls and callbacks are necessary for I/O processing. Accordingly, the SCBI is a common interface that reduces the amount of code needed to access the intermediate processing and transport blocks. As previously stated, the SCBI provides a common method of passing SCSI commands between FETs, processing blocks, and BETs that is transport independent. As used herein, a block refers to a FET, BET, or a processing block. Furthermore, these blocks can use the interface without requiring knowledge of the underlying hardware and allow the interface to determine the best method of passing commands. In addition, SCBI provides the routing and messaging functionality to interface with a plurality of applications on a plurality of processors. Accordingly, SCBI provides the flexibility to allow users to assign storage applications to whichever processor that will make the most sense for their particular application. These applications can use the interface regardless of the processor on which they reside and allow the interface to determine the routing and providing the messaging functionality.

As will be understood by those skilled in the art, the interface is constructed using networked computer systems with software programs designed to carry out the functions described herein. Although the disclosed embodiments are generally described with reference to networked computers, those skilled in the art will recognize that the present invention can be implemented in conjunction with other program modules for other types of computing devices.

According to one aspect of the present invention, the SCBI is implemented in a distributed computing environment. In a distributed computing environment, program modules may be physically located in different local and remote memory storage devices. Execution of the program modules may occur locally in a stand-alone manner or remotely in a client/server manner. By way of illustration and not limitation, distributed computing environments include local area networks (LAN), enterprise-wide area networks (WAN), the global Internet (wired or wireless connections), and storage area networks (SAN). Accordingly, it will be understood that the terms computer, operating system, and application program include all types of computing devices and the program modules designed to be implemented by the computing devices.

The discussion of methods that follows, especially in the flow charts, is represented largely in terms of processes and symbolic representations of operations by conventional computing components, storage devices, connected display devices, and input and output devices. Furthermore, these processes and operations may use conventional computer components in a heterogeneous distributed computing environment, including remote file servers, remote computer servers, and remote storage devices. Each of these conventional distributed computing components is accessible via a communication network.

The processes and operations performed include the manipulation of signals and the maintenance of these signals within data structures that reside in one or more of the local or remote storage devices. Such data structures impose a physical organization upon the collection of data stored within a storage device and represent specific electrical, optical, magnetic, or similar elements. These symbolic representations are the means used by those skilled in the art of computer programming and computer construction to effectively convey teachings and discoveries to others skilled in the art.

For the purposes of this discussion, a process is understood to include a sequence of executed steps leading to a concrete, useful, and tangible result, namely, the effecting of a SCSI control block interface for the quick, efficient processing of SCSI tasks.

These steps generally require analysis and manipulations of data such as processing I/O, target and initiator information, error handling, storage virtualization, and other related information. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files, blocks or the like. It should be kept in mind, however, that these and similar terms should be associated with appropriate quantities for computer and storage operations, and that these terms are merely conventional labels applied to quantities that exist within and during operation of the processing.

It should also be understood that manipulations within a computing device are often referred to in terms such as displaying, deciding, storing, adding, comparing, moving, positioning, placing, and altering which are often associated with manual operations performed by a human operator. The operations described herein include machine operations performed in conjunction with various input provided by a human operator or user that interacts with the computer. In addition, it will be understood that the programs, processes, routines and methods described herein are not related or limited to any particular computer or apparatus, nor are they related or limited to any particular communication network architecture. Rather, various types of general-purpose machines may be used with program modules constructed in accordance with the teachings described herein. Similarly, it may prove advantageous to construct a specialized apparatus to perform the method steps described herein by way of dedicated systems in a specific network architecture with hard-wired logic or programs stored in nonvolatile memory, such as read only memory.

With the foregoing in mind, the drawing figures starting with FIG. 1 illustrate various functions, processes, or routines carried out by an embodiment of the present invention in which the disclosed interface carries out the functions described in connection with the flow charts and SCSI control block processing. The functions or processes in these figures are carried out by software executing in computing devices associated with the interface. Depending upon the particular operation, the computing devices are connected for data communications via a network such as the Internet or a SAN. It will also be understood that the processes and methods presented here may be arranged differently, or steps taken in a different order. In other words, some processes and methods may be deleted, repeated, re-ordered, combined, or blended to form similar processes and methods.

Turning now to the figures, in which like numerals indicate like elements throughout the several figures, FIG. 1 provides an overview of an exemplary embodiment of a storage application device 10 that utilizes a SCBI 20. A storage application device 10 is any device that processes storage input and output (I/O) initiated by an application client 42 before delivery to a physical storage device 52.

The SCBI 20 includes an API and related structures that can operate in a multi-threaded, multi-processor, multi-tasking environment independent of the actual hardware architecture of the device 10. An exemplary storage application device 10 in which SCBI 20 operates is the iDISX 2000 Storage Management Engine by iVivity, Inc. (Norcross, Ga.). This storage management engine is described in patent application Ser. No. 10/717,175 filed Nov. 19, 2003, which is hereby incorporated by reference in the entirety and made part hereof. However, those skilled in art will recognize that a SCBI is not limited to this particular hardware architecture, but may be implemented in devices that are designed to process SCSI tasks, even single processor devices. As used herein, a SCSI task and a SCSI command are used interchangeably.

According to one aspect, storage I/O 45 are originated by an application client or initiator 42. As illustrated, storage I/O 45 are transported across a WAN 40 for processing. Those skilled in art will recognize there are a plethora of possible embodiments for delivery of storage I/O 45 from an application client 42 to a storage application device 10. A SCSI command descriptor block is embedded in a transport structure by the application client 42 for delivery across a network 40. The storage I/O 45 are received by a FET 32 within the storage application device 10. The FET 32 strips out any I/O data from the transport structure and stores the I/O data in shared memory. A transport independent structure referred to as a SCSI control block (SCB) 25 is created, which includes the SCSI CDB and routing information. The SCB 25 is passed to the SCBI 20 for processing. The SCBI 20 determines the necessary routing to process the SCSI command.

The SCBI 20 provides routing for processing SCSI tasks contained within SCSI command descriptor blocks (CDBs). CDBs, which are embedded in a transport protocol structure for transportation across a network 40, 50, are received by the storage application device 10. However, for any storage implementation, the storage application will need to process the SCSI command regardless of the transport protocol used to transport the I/O. As a result, the SCSI processing hand-off interface 20 has to be independent of the storage transport protocol. Therefore, SCBI 20 interfaces with storage applications 36 at the SCSI architectural level. Hence, a FET 32 creates a protocol independent structure called a SCSI control block (SCB) 25, which includes the embedded SCSI CDB. Accordingly, the interface 20 remains independent of whether the transport is iSCSI, FCP, and so forth.

SCSI tasks requiring processing are routed to a SCSI processing block 34. The operations required for processing SCSI tasks are well known in the art. In addition, processing blocks 36 perform storage application functions such as RAID or storage virtualization. After any necessary processing, one or more mapped I/O are passed to a BET 38 where the command is sent out across a SAN 50 to a target or physical device 52. Those skilled in art will recognize there are a plethora of possible embodiments for delivery of storage I/O 55 from a storage application device 10 to a target 52.

After completion of processing a task, a response flows back in the reverse process and SCBI 20 returns a SCB 25 to the originating block. For example, if a processing block 36 sent the SCB to a BET 38, the response would be returned to the processing block 36. If a FET 32 sent the SCB 25 to a processing block 36, the response would be returned to the FET 32.

Figure 2:
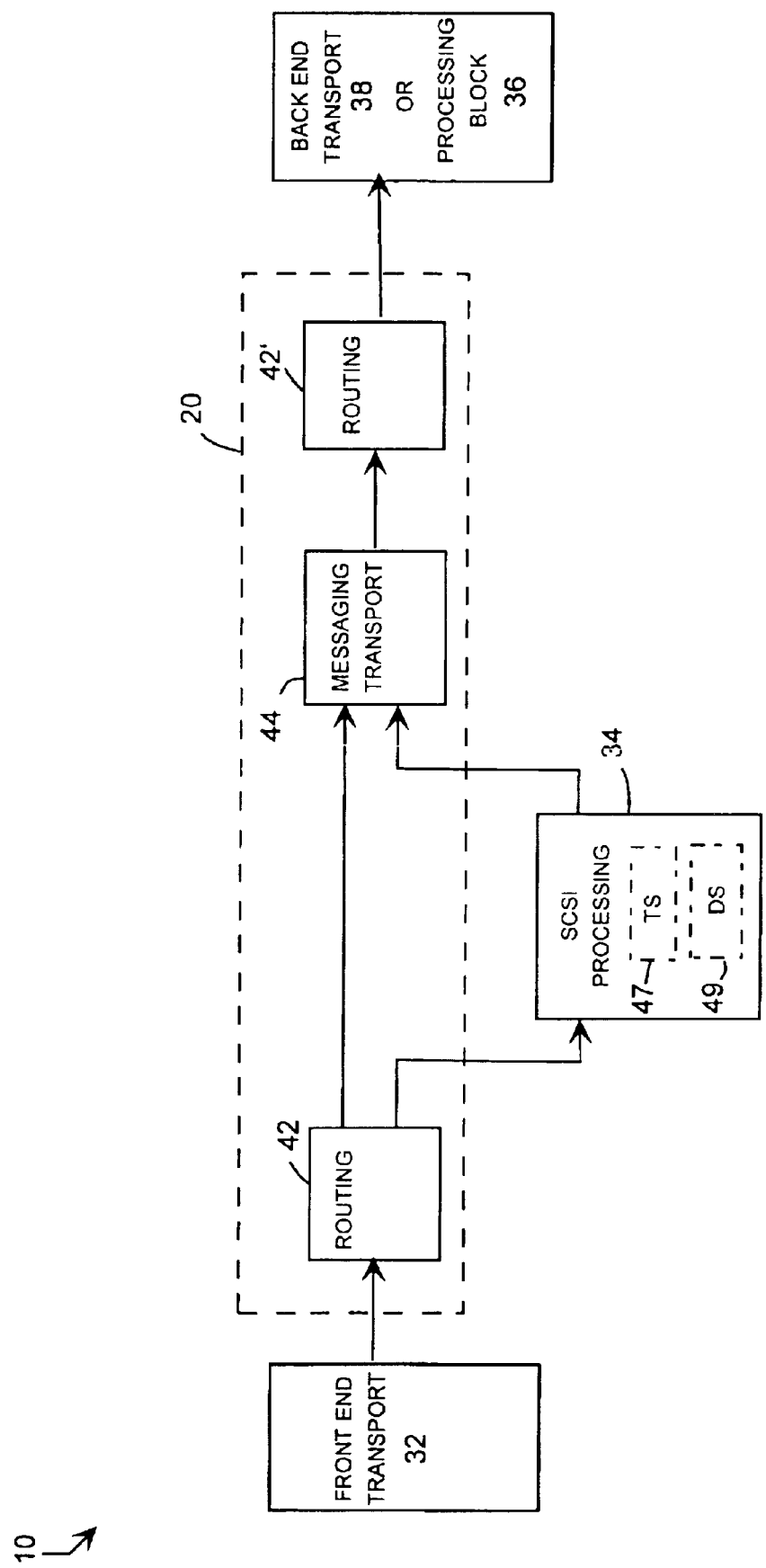
FIG. 2 is a functional block diagram illustrating the functional blocks of an exemplary SCSI control block interface.

Turning to FIG. 2, the SCBI 20 provides routing functionality 42 and messaging transport functionality 44 for processing SCSI commands. Consequently, SCBI 20 routes a transport independent SCB to the modules for processing. The SCB structures are described in reference to FIG. 10 through FIG. 19. As illustrated in FIG. 2, a SCB is passed to the routing layer 42, passed to a SCSI target emulator 46 if necessary, and forwarded by a messaging transport 44 if the modules are on another processor to either a processing block 36 or a BET 38.

As discussed, the interface 20 receives a SCB and determines the required processing. The routing function 42 uses information contained within the SCB and a routing table to determine the necessary routing as discussed below.

SCSI tasks requiring processing are routed to a SCSI processing block 34. SCSI task processing is performed by a SCSI task scheduler (TS) 47 in combination with a SCSI device server 49. The operation of a SCSI task scheduler 47 and SCSI device server 49 is well known in the art for processing SCSI tasks. However, SCBI 20 allows the task scheduler function 47 to reside on a different processor than the device server function 49. In addition, SCBI 20 allows a user to define which SCSI tasks will be offloaded to the device server 49 for processing.

If the storage application, such as RAID processing, is to be performed on another processor, the routing function 42 passes the SCB to the messaging transport 44 for delivery to the routing function 42' on that other processor. The routing function 42' passes the SCB, as appropriate, to a processing block 36 for storage application processing, or alternatively, to a BET 38 for delivery of the I/O to a target 52.

As previously stated, SCBI 20 uses information contained within the SCB and a routing table to determine routing 42. An exemplary routing table entry is described in reference to FIG. 21. A FET 32 uses a SCBI_SendCommand( ) call to pass a SCB to the SCBI 20.

To perform the routing function 42, SCBI 20 first checks the SCB virtual device identifier (vdId) field. The virtual device identifier determines which device is to be accessed. For read and write operations it provides a faster method of looking up the final destination of a command than can be obtained from port/target/logical unit number (LUN) information. All SCB commands require both the original port/target/LUN information and a virtual device identifier. If the field is not all FFs, then the vdId was known by the FET 32. Then the routing table is checked to determine if the qid (a processor identifier) is valid for the vdId. If either of these checks fails, the SCB is routed to the device server 49 for error processing.

If the initial checks are passed, the logical unit block (LUB) structure associated with vdId is determined and the pointer is placed into an internal processing plub field. The LUB table is composed of individual structures, one structure per device. The structure contains the information for use by SCBI 20 in implementing device specific SCSI protocol. An exemplary LUB is described in reference to FIG. 23.

Next, the virtual disk bit is set in the SCB based upon the routing table value. If the virtual disk field is 0, the SCB is a pass through type. If the bit is set to 1, the target device requires target emulation and needs SCSI processing. Next, the command type is determined. A SCSI command type is defined by 0x01 setting in the command type field, and a task management function (TMF) command type is defined by 0x02 setting. The SCSI command function is used for most SCSI processing functions. Task management functions are only used for certain error management situations. TMF control blocks are routed to the task scheduler 47 and then passed to the device server 49. For standard I/O processing, the SCB is routed to the task scheduler 47 for processing.

If all the checks are passed, the vdId is valid, and the command is not a TMF, then command will be processed. The aca bit of the routing table is checked. If the bit is set, then the processing is in aca mode and only aca error handling commands can be executed. If the aca bit is not set, standard process will occur.

The task scheduler 47 checks the routing table to determine if the I/O can be processed at this time. Accordingly, the task scheduler 47 checks the counters against SCSI rules. For example, a head of queue can always be processed before others, ordered can only be processed one at a time, simple can be processed in front of other simples but not in front of a head of queue or ordered, and untagged can be processed if another untagged is not already being processed. In addition, the queue frozen counter is checked. If a queue is frozen, a busy status is returned and SCBI 20 returns the I/O to the FET 32. The FET 32 delivers the busy status to the initiator to try at a later time.

The head and tail pointers in the routing table are used to queue the processing of I/O. Once a command processing is completed, the counters are updated, and the rules are applied to the command that is in the head of queue to determine if that command can be processed at this time. This queue process allows commands to be reordered and processed as necessary. Accordingly, a processing block 36 or a BET 38 does not have to be concerned about the ordering rules when performing their command processing functions.

Figure 18:
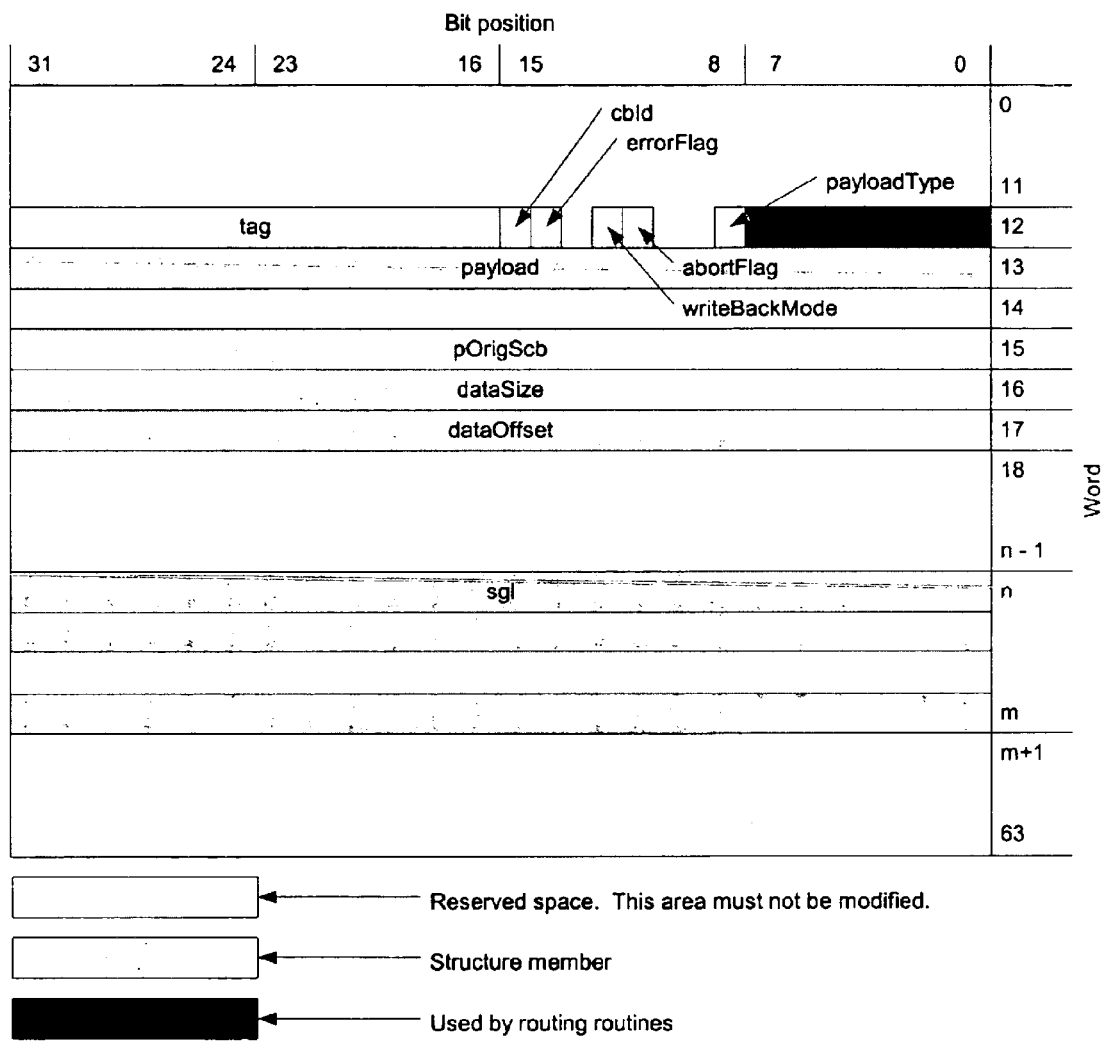
FIG. 18 is a data structure illustrating an exemplary data out control block (DOCB) structure.

If a command can be processed, it is checked to determine if the command is a read or a write. If the command is not a read or write, the task is forwarded. For a read or write command, the allocBuffer field is checked in the routing table. If the bit is 0, no buffers need to be allocated and the task is sent to the forwarding function. If the bit is a 1, the payload field is checked. If the payload field is 0, then buffer was not supplied by the FET 32 and a buffer is requested at this time. Now, the payload field is set to 1 since a buffer is available. Next, the I/O size field is checked against a data transferred field. If the command is a write and all the data has been received or the command is a read, the task is sent to the forwarding function. If all the data has not been received, the data is requested from the FET 32 using the request payload function. The request payload function is passed using the general function pointers stored in the interface list. The interface list is described in reference to FIG. 22. A data out control block (DOCB) structure described in reference to FIG. 18 is used to pass partial payloads. When all the data is received, the task is sent to the forwarding function.

In the forwarding function, a check is made to determine if the command is for a virtual device or a pass through. If the command is a pass through type, the command is sent directly to the routing function. For a virtual device, a processing definition of the read or write command is determined. A mask is set during initialization for processing blocks to indicate which commands that block will process. A bit map set to 1 indicates the device server 49 processes the command, a 0 indicates a processing block 36 or BET 38 can support the command. The command is sent to the routing function with destination set for either the device server 49, processing block 36, or BET 38 based upon the previous check.

After being passed to the routing function, the qid is determined from the routing table. If the qid matches the qid of the local processor, the receive handle is retrieved from the routing table based upon the vdId. The receive handle is used to index the interface list for the receive command function pointer. Then function pointer is called and the SCB is passed.

If the qid do not match, a message with the vdId and the SCB is sent to the qid of the processor determined from the routing table. Again, that processor determines if the qid matches the qid of the local processor. If the qid match, the receive handle is retrieved from the routing based upon the vdId. The receive handle is used to index the interface list for the receive command function pointer. Then function pointer is called and passes the SCB. Otherwise an error is generated.

The messaging function handles the delivery of the data structures to the appropriate blocks 32, 34, 36, 38. Hence, the transport blocks 32, 36 do not need to know the actual hardware management involved with the routing. The interface 20 handles all the routing functions 42.

The passing of structures 52, 54 between a transport 32, 38 and intermediate blocks 18 uses an underlying messaging system implemented in either hardware or software. The processing of a control structure 52, 54 uses three message types: a command message, a command response message, and a general function message. When passing a command is still being processed, the command message is used. When returning a command that has completed, the command response message is used. When a general request or response is needed, the general function message is used.

All messages have the same basic header, having the following general structure:

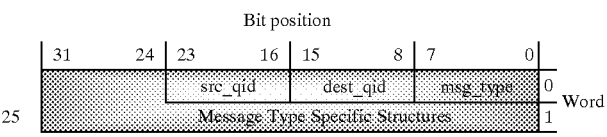

where the fields are:

| Field | Description |
| --- | --- |
| msg_type | A value determining the message type. Values for SCBI messages are: 0x60 IDISX_SCBI_CMND_MSG_TYPE 0x61 IDISX_SCBI_CMND_RSP_MSG_TYPE 0x62 IDISX_SCBI_GEN_FUNC_MSG_TYPE |
| dest_qid | The queue identifier for the recipient of the message. |
| src_qid | The queue identifier of the sender of the message. |

For command message and command response messages, the unique portion of the command and command response messages are formatted as:

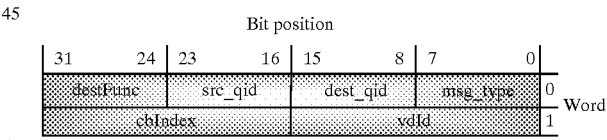

where the fields are:

| Field | Description |
| --- | --- |
| destFunc | The destination for the command. This field is only needed if target emulation is being used. If target emulation is not being used, this field must be cleared to 0. The defines for this field are: 0x01 SCBI_TASK_ROUTER 0x02 SCBI_TASK_SCHEDULER |
| vdId | The virtual device identifier of the device to be accessed. |
| cbIndex | The index of the SCB structure holding the command. |

The general function message is used for many different requests and responses. The generic message structure is:

| Bit position | | | | |
|---|---|---|---|---|
| 31   24 | 23   16 | 15   8 | 7   0 | |
| type | src_qid | dest_qid | msg_type | 0 |
| General Message Type Specific Structures | | | | 1 |

Word

The fields are:

| Field | Description |
|---|---|
| type | A value determining which general function is contained in the message. The defines for this field are:<br>0x03 SCBI_GEN_REQ_PAYLOAD_TYPE<br>0x04 SCBI_GEN_PAYLOAD_UPDATE_TYPE<br>0x05 SCBI_GEN_REQ_MIPS_QID_TYPE<br>0x06 SCBI_GEN_REQ_MIPS_QID_RSP_TYPE<br>0x07 SCBI_GEN_REQ_HNDL_BASE_TYPE<br>0x08 SCBI_GEN_REQ_HNDL_BASE_RSP_TYPE<br>0x09 SCBI_GEN_VDID_UPDATE_TYPE<br>0x0A SCBI_GEN_SEND_PAYLOAD_TYPE |

The structure of this word is dependent on the message type field. Several types are used only for setting up the routing of commands and are not part of the command processing.

For request/send payload message and payload update messages, these messages are used to handle streaming operations that require that processing of a command take place prior to all the data being available or data buffers being assigned.

The request/send payload and payload update message structure is as follows:

| Bit position | | | | |
|---|---|---|---|---|
| 31   24 | 23   16 | 15   8 | 7   0 | |
| type | src_qid | dest_qid | msg_type | 0 |
| cbIndex | | vdId | | 1 |

Word

The new message specific fields are:

| Field | Description |
|---|---|
| vdId | The vdid of the device to which the SCB was sent. This field is not valid for response messages. |
| cbIndex | The index of the SCBI_DOCB or SCBI_DICB holding the command. |

The request payload message is used when data is needed, such as during writes. The SCBI_DOCB holding the command is sent to the originator's general function callback. After the originator has put the requested data in the supplied buffer, it will call SCBI_PayloadUpdated( ). The SCBI_DOCB will then be returned. The DOCB data structure is described in reference to FIG. 18.

The send payload message is used when data is to be returned to the application client. The SCBI_DICB holding the command is sent to the originator's general function callback. After the originator has sent the requested data to the application client, it will call SCBI_PayloadUpdated( ) if an error occurred with the transfer, or the ackFlag was set to a 1. If the ackFlag was not set to a 1, the FET 32 will free the SCBI_DICB, otherwise the SCBI_DICB will be returned. The DICB data structure is described in reference to FIG. 19.

The payload update message is used to return the response to any of the four previous messages. The called processor will route the received SCB, SCBI_DOCB, or SCBI_DICB to the pGENERAL_FUNCTION( ) function of the registered block (described further on). SCBI 20 will then route the SCB, SCBI_DOCB, or SCBI_DICB to the general function of the initial sender of the previous message.

In connection with request MIPS qid message and response, these messages are used to propagate the MIPS qid to routing routines. The request MIPS qid message structure is:

| Bit position | | | | |
|---|---|---|---|---|
| 31   24 | 23   16 | 15   8 | 7   0 | |
| type | src_qid | dest_qid | msg_type | 0 |
| reserved | | | mipsQid | 1 |

Word

The new message specific field is:

| Field | Description |
|---|---|
| mipsQid | This field is only valid for the MIPS qid response message. It contains the qid of the MIPS processor, which is needed for routing commands when emulating a target device. |

Routing routines will send this request to the processor running the initiator handle assigner process. When a routing routine initializes, it constructs a map of processors (qids) to send commands. Since the MIPS processor does not know in advance what qid that it will receive, these messages allow transmission of its assigned qid to propagate to all routing routines. The expected order of events is as follows: MIPS obtains its qid, MIPS sends its qid to the initiator handle assigner process, the routing routines initialize and request MIPS qid, and the processor with the initiator handle assigner process returns responses to the routing routines. It is the responsibility of the routing routines to not allow SCBI_RegisterInterface( ) to complete until after the MIPS qid is received. Otherwise some commands may not be routed properly.

In connection with request handle base message and response, these messages are used to let routing routines know what their base handle is. The request handle base message structure is:

| Bit position | | | | |
|---|---|---|---|---|
| 31   24 | 23   16 | 15   8 | 7   0 | |
|  |  |  |  | 0 |
| reserved | | |  | 1 |

Word

The new message specific field is:

| Field | Description |
|---|---|
| handleBase | This field is only valid for the response message, and holds the assigned handle base. It is undefined for the request message and can contain any value. |

The base handle is an identifier for the routing routine enabling responses to be sent to the proper processor. Coupled with a routing routine supplied id, the full handle returned from an SCBI_RegisterInterface( ) handle call fully specify the path to the callback for the command. When routing routines receive the registration call, they will assign an id to caller, add the base handle to the id, and return the resulting handle. It is the responsibility of the routing routines to return handles for registration calls only after they have received their base handle.

Figure 3:
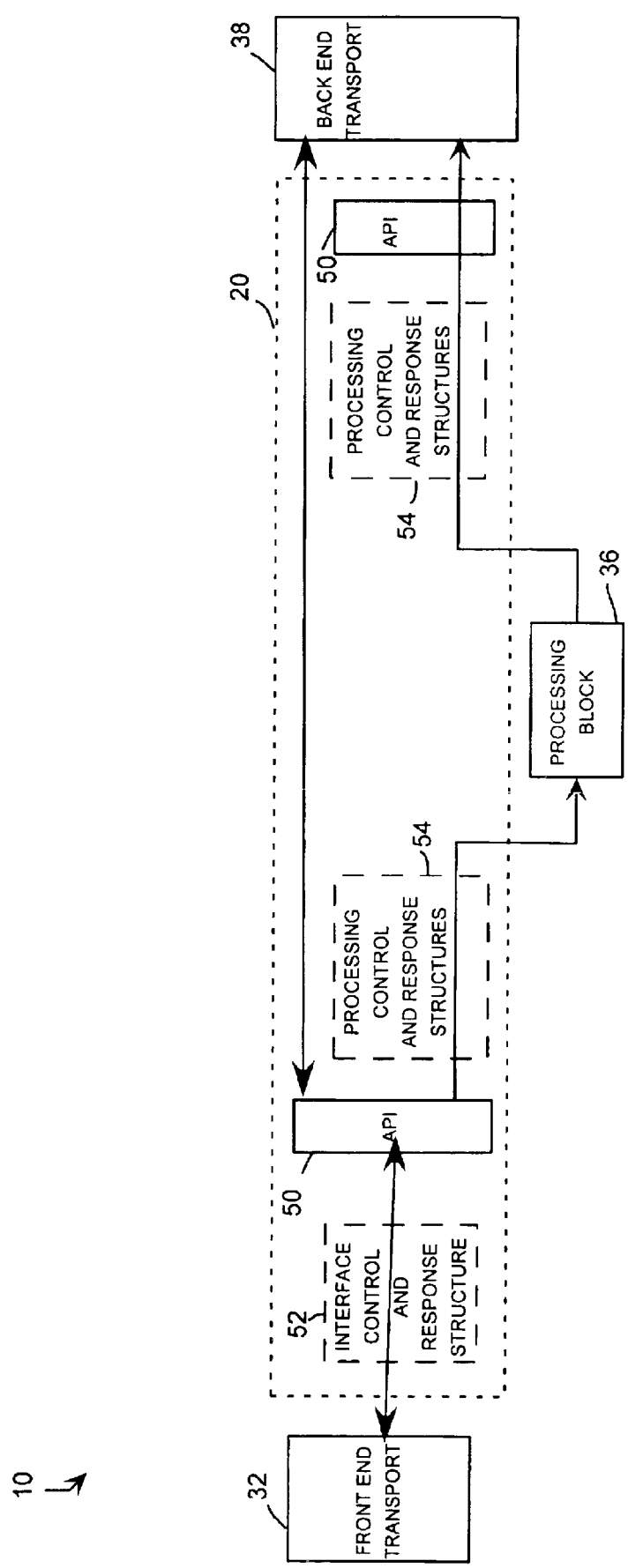
FIG. 3 is a functional block diagram illustrating the design overview of an exemplary SCSI control block interface.

FIG. 3 illustrates the relationship between the API 50, the FET 32, and the BET 38. As will be discussed in greater detail, the interface 20 includes a registration function to register modules, general function for receiving interface information and requests, callback function for receiving completed commands, message function for transporting commands, control structures, and other functions. The data structures for passing commands are described in reference to FIG. 10 through FIG. 19.

Figure 10:
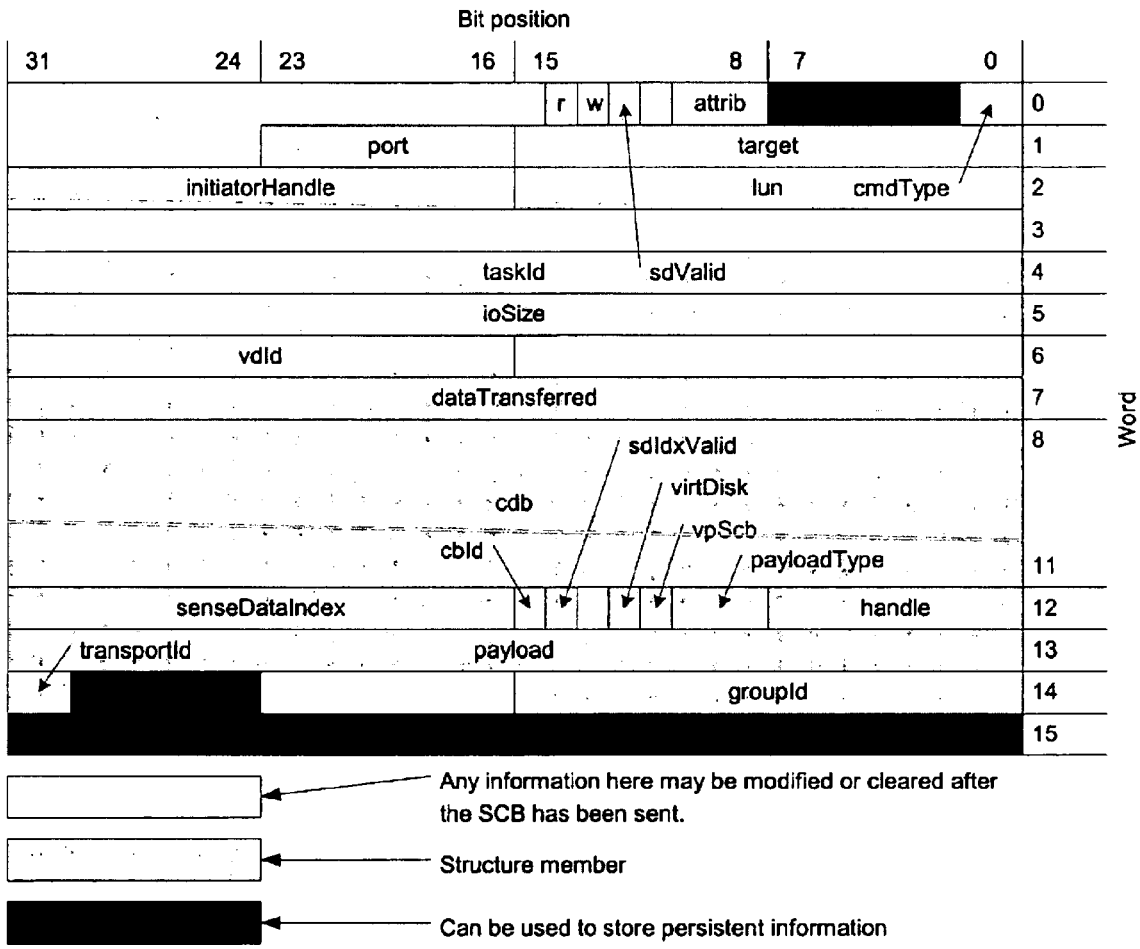
FIG. 10 is a data structure illustrating an exemplary SCSI control block interface control structure.

A protocol independent SCBI control structure that is passed between a FET 32 and SCBI 20 is described in reference to FIG. 10. Accordingly, the interface 20 remains independent of whether the transport is iSCSI, FCP, or even a future transport. Internally, SCBI 20 routes a SCB processing control structure to the modules for processing. A SCB process control block structure is described in reference to FIG. 14.

The registration function sets up the necessary structures in the interface 20 and reports the callbacks needed for receiving responses. The initialization process flow is described in reference to FIG. 4.

At initialization, each module that needs to pass commands through the SCBI 20 calls the registration function, passing in four function pointers that will receive commands, task management functions (TMF), responses from commands, and general requests. The registration function format is as follows:

```
void SCBI_RegisterInterface(
    void(*pGENERAL_FUNCTION) (char type, UINT32 genRsp),
    void(*pRECEIVE_COMMAND) (pSCBI_SCB pScb),
    void(*pRECEIVE_TMF) (pSCBI_SCB pScb),
    void(*pCALLBACK_FUNCTION) (pSCBI_SCB pScb) );
where pGENERAL_FUNCTION is the function that receives the
general responses, pRECEIVE_COMMAND is the function
that receives SCB commands, pRECEIVE_TMF is the function
that receives TMF commands, and
pCALLBACK_FUNCTION is the function that is called upon
SCB processing completion.
```

When the interface is ready to be used, a handle will be returned to the function pointed to by pGENERAL_FUNCTION. This handle will be used internally to identify the registering routine and is provided with all requests. After obtaining the handle, a calling routine can immediately start using the interface 20. Those blocks 32, 36, 38 that will originate control structures need to make this registration call.

The interface control and response structure 52 are passed between the transports 32 and the API. The process control and response structure 54 are passed within the interface 20 and to a processing block 36 or a BET 38. The processing control and response structures 54 duplicate the interface control structures 52 except that some previously unused interface fields are used to handle routing. All persistent interface fields are considered reserved and are not modified. Thus, structures may be passed between blocks with minimum modification of data.

As a result, blocks 32, 36, 38 can use the interface without knowledge of the underlying hardware and can allow the interface 20 to pass commands. The send function format is:

void SCBI_SendCommand(pSCBI_SCB pScb);

where pScb is the control structure for the command.

When a command completes, the SCB response will be returned to the callback_function supplied during registration. The callback function format is:

void callback_function(pSCBI_SCB pScb);

where pScb is the SCBI response structure for the command completed. For standard commands, the returned SCBI response structure is described in reference to FIG. 12.

Commands may be forwarded through the processing steps without data being present or buffers having first being assigned. Several functions exist to retrieve this information later when it is required. There are four functions available for this:

SCBI_PayloadRequestBuffer( ),
SCBI_PayloadRequest( ),
SCBI_PayloadSend( ), and
SCBI_PayloadBufferAllocated( ).

In order to use these functions, the calling routine must provide a function which will receive the response. The format for this function is:

void PAYLOAD_UPDATED_RSP(void*pCb);

where pCb is the pointer to the SCB, SCBI_DOCB, or SCBI_DICB for which a payload operation was requested. Fields in the structures will be updated to reflect the requested operation. Two structures are necessary for the partial payload requests: SCBI_DOCB and SCBI_DICB. These partial payload structures are discussed in reference to FIG. 18 and FIG. 19, respectively. The function itself is called when pGENERAL_FUNCTION( ) is called with an SCBI_GENFUNC_UPDATED_PAYLOAD parameter, as discussed later.

Currently there are three defined payload types: a scatter-gather list (SGL), linked list, and direct types. For direct payloads the payload field is a physical pointer to a data buffer containing the data. The ioSize field of the SCB specifies the size of the data. For linked lists the payload field points to the first data buffer in the list. The list itself is singly linked and has for each data buffer an associated link element that points to the next data buffer in the list. An API exists to allocate buffers, return the link element for a particular buffer, and to traverse the list. For a SGL type the payload field points to an SGL. A SGL is described in greater detail in reference to FIG. 20.

The general function allows processing responses and requests to get back to the command originator. The function handles five different operations:

SCBI_GENFUNC_REGISTERED_HANDLE,
SCBI_GENFUNC_REQ_PAYLOAD,
SCBI_GENFUNC_SEND_PAYLOAD,
SCBI_GENFUNC_CONFIG_UPDATED,
SCBI_GENFUNC_UPDATED_PAYLOAD.

The values passed in to the general function for each operation are:

If type=SCBI_GENFUNC_REGISTERED_HANDLE, genRsp=the assigned handle.

If type=SCBI_GENFUNC_REQ_PAYLOAD, genRsp=a physical pointer to the SCBI_DOCB structure that holds the data request. The SCBI_DOCB structure is discussed in reference to FIG. 18. The SCBI_DOCB structure must only be returned after the requested data has been retrieved and stored in the buffer, or when an error has been detected. In the case of an error, the SCBI_DOCB structure will have its errorFlag field set.

If type=SCBI_GENFUNC_SEND_PAYLOAD, genRsp=a physical pointer to the SCBI_DICB structure that holds the data request.

Figure 19:
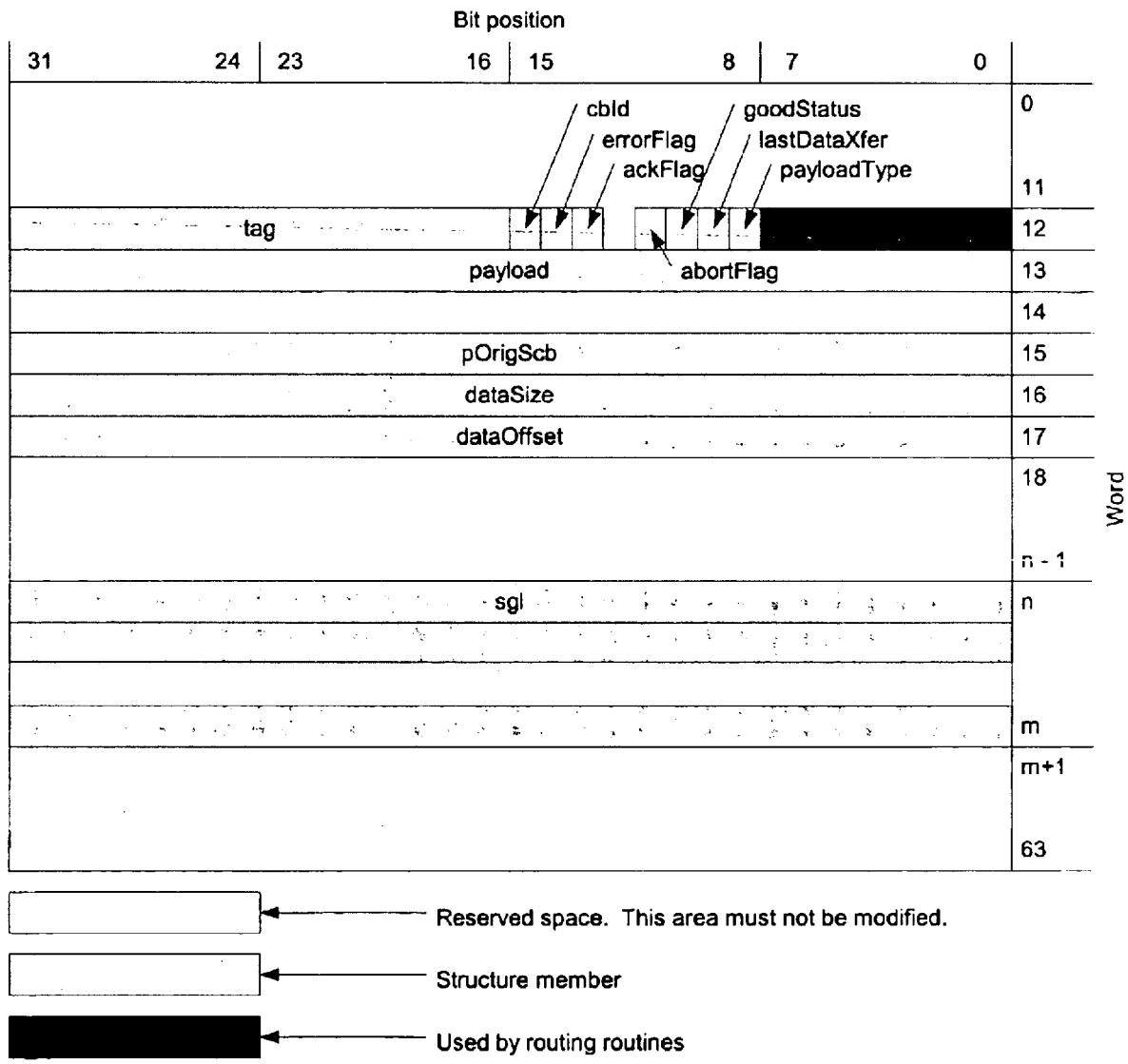
FIG. 19 is a data structure illustrating an exemplary data in control block (DICB) structure.

The SCBI_DICB structure is discussed in reference to FIG. 19. The SCBI_DICB must only be returned after the requested data has been transferred, or when an error has been detected. In the case of an error, the SCBI_DICB structure will have its errorFlag field set. Note that is it possible the SCBI_DICB will never be returned.

If type=SCBI_GENFUNC_CONFIG_UPDATED, genRsp=no meaning. This option is used to notify the FET, processing block, or BET that the device configuration (i.e. routing table and/or logical unit block structure) has changed.

If type=SCBI_GENFUNC_UPDATED_PAYLOAD, genRsp=a physical pointer to the SCB, SCBI_DOCB, or SCBI_DICB that had its payload field or data buffer updated.

For SCBI_GENFUNC_REQ_PAYLOAD and SCBI_GENFUNC_SEND_PAYLOAD it is required that after the information is processed and completed, SCBI_PayloadUpdated( ) must be called.

When the transport sends a command to the API 50, the pRECEIVE_COMMAND supplied during registration is called and passed the interface control and response structures 52. In the case of a TMF, the pRECEIVE_TMF function supplied during registration is called. At that point the SCBI owns the structure and must use the processing control and response structures 54 defined in FIG. 15 through FIG. 19. The format for the functions are:

void (*pRECEIVE_COMMAND)(pSCBI_SCB pScb);

or void (*pRECEIVE_TMF)(pSCBI_SCB pScb);

where pScb is the control structure for the command.

However, for the API 50 to be operational and receive commands, SCBI 20 must first be initialized to set up the tables used during the routing processes. An initialization routine is described in detail in reference to FIG. 4.

Figure 4:
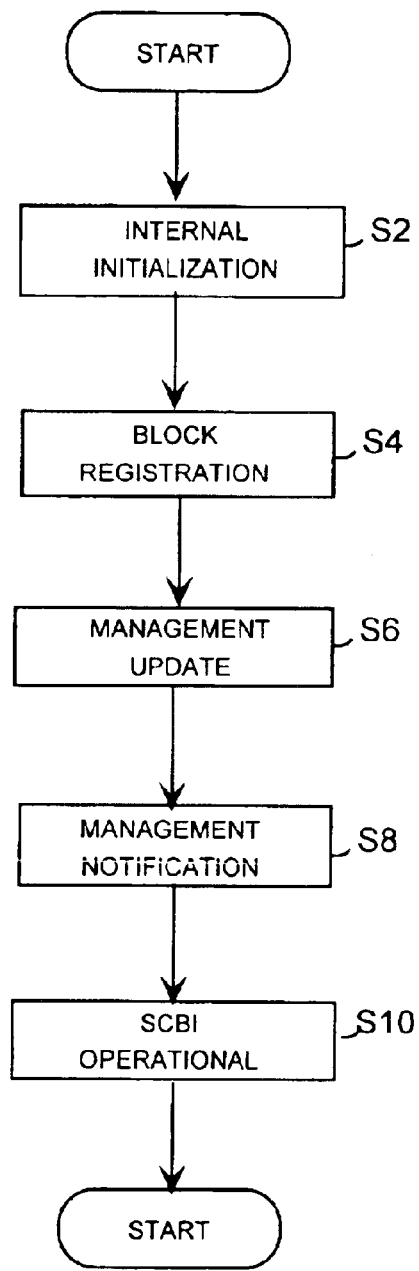
FIG. 4 is a flow diagram illustrating an exemplary initialization routine.

Turning now to FIG. 4, an exemplary initialization routine is illustrated. Starting at step S2, the SCBI is initialized. Each processor upon startup executes its initialization process. Each module performs an initialization process necessary to execute its functions independent of SCBI. However, part of a module initialization process is to call SCBI_ModuleInit( ) function. This call ensures that SCBI is active; otherwise the call forces the SCBI layer to become activated.

Upon activation, the SCBI layer awaits for the SCSI task scheduler to send its processor queue identifier (qid), which identifies on which processor the task scheduler resides, to the SCBI centralized process. After the processor on which the task scheduler is identified, the SCSI device server (DS) provides its qid. After which, the SCBI layer allows each module to identify the processor on which it resides.

The call SCBI_ModuleInit( ) function returns 8 function pointers to a calling block. The function pointers returned are for the following functions: SCBI_SendCommand( ), SCBI_PayloadSend( ), SCBI_DeviceConfig( ), SCBI_PayloadUpdated( ), SCBI_IOStatus( ), SCBI_PayloadRequest( ), SCBI_Poll, and SCBI_RegisterInterface( ). The function pointers returned allow a block to directly use one of the above eight functions directly. The block stores the function pointers returned as a local variable. The function can be called by use of the variables. The SCBI_RegisterInterface( ) function allows the block to register with SCBI as per step S4. At this point however, SCBI does not necessarily know which processor has which modules.

In step S4, the block calls the SCBI_RegistrationInterface( ) function. At this step, a block is calling the function pointer that was returned from the SCBI_ModuleInit( ) event. The SCBI_RegistrationInterface( ) function passes in four additional functions. This function call passes the general function name, the receive command name, the task management function name, and the receive response name. Not all blocks use all four functions, and for functions not used by that block, a null pointer would be returned. For example, a FET uses GeneralFunction( ), and ReceiveRsp( ) callback functions. A BET utilizes GeneralFunction( ), ReceiveCommand( ), and RecieveTmf( ) callback functions. However, a processing block could utilize all four functions. The function pointers are placed in an interface list table. A handle is generated that is associated with the block.

The calling routine must provide an initiator handle when sending commands. This is necessary to track the commands in the appropriate task sets, especially if task management functions such as CLEAR TASK SET and ABORT TASK SET are in use. Further, tracking initiators is required if access controls are needed. However, if those task management functions and access controls are not necessary, initiator handles are not needed and the initiatorHandle field of the control structure (defined later herein) may be cleared to a zero.

When SCBI is operational across all modules, the handle is returned back to the block via the GeneralFunction( ) function, at which point the handle is used for communications between the block and SCBI. The interface list table is a structure enables SCBI to return back to a block. After receipt of a handle, a block awaits notification that devices are available.

After receipt of its handle, a BET makes a call to the send device list function. When a BET becomes aware of a device, it creates a structure to record device information. The structure includes drive capacity, virtual disk identification number (vdId), indication of virtual disk, allocation of buffers required, and redirect command routing to indicate whether to override the device server SCSI commands. Preferably, the assignment of vdIds are arbitrated by a process outside of SCBI, such as a virtualization process or other management function. After receipt of its handle, a BET calls SCBI_SendDeviceList( ) function to pass the device list. SCBI duplicates the structure in the creation of a routing table. SCBI associates that BET handle, the vdIds, and the drive properties that were passed by that BET. The created routing table is indexed by the vdId that was passed as part of the device structure. Accordingly, the SCBI routing table is populated with handle of the application, the vdId of each of the drives, and the associated properties of the drives. After populating the routing table, a management function is updated with the known information per step S6.

Once the routing table is populated locally, the device list is passed to the task scheduler. The task scheduler populates its own table for its internal use. The task scheduler also updates the master virtual disk table controlled by a management function outside of SCBI. Accordingly, a process outside of SCBI has a call made by the task scheduler to that management process and passes the device information. Still within step S6, the management function receives device information from all processes on the system.

At some point, as per step S8, the management utility will call back to the task scheduler and will pass information associated will all the logical units known by the system. Accordingly, routing tables are built up locally on each processor that operates SCBI on their local devices, but a management function has knowledge of all attached devices.

At the predetermined point, the management function passes all known system wide device information back to the task scheduler. The task scheduler then calls every interface about new known devices using the configuration updated call. The previously populated interface list is used to call the known interfaces. Next, the SCBI centralized process sends to each processor that registered with SCBI a message that devices have been updated. Each processor updates all the processes on its processor. Accordingly, all interfaces receive the updated device message. Consequently, at the end of the flood, every processor has knowledge of every device known by the system by the configuration update function.

At this point, all processes have been notified that devices exist. If another device comes online, the configuration process is repeated and the new device information is propagated throughout the system.

At propagation of the device information, the SCBI is operational for the known devices as per step S8. FETs can now pass commands and task management forward to SCBI.

Figure 5:
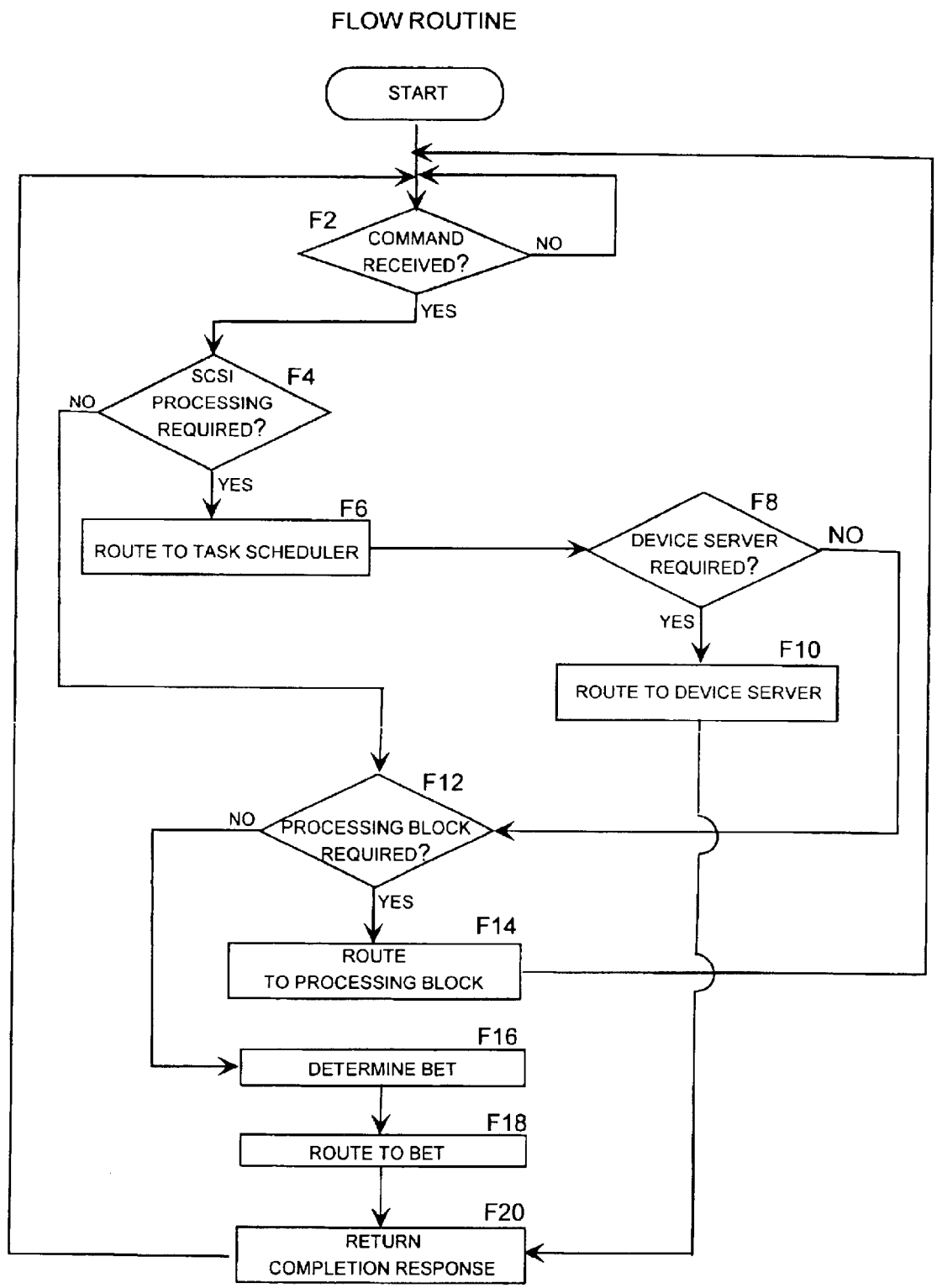
FIG. 5 is a flow diagram illustrating an exemplary SCSI command processing routine.

Turning now to FIG. 5, a flow routine for processing SCSI commands is illustrated. The flow routine outlines the major steps performed by the SCBI during routine operation.

The routine starts at step F2 where the SCBI awaits the reception from a FET of a storage device for a SCSI task to be processed. Commands for a storage device, referred to as targets, are initiated by application clients called initiators. The initiators generate a SCSI command descriptor block (CDB) structure that provides the target with the information necessary to execute the SCSI task. The CDB is encapsulated within a transport protocol structure and delivered over a network. A FET on a storage device receives the delivered communication. However, in order to achieve flexibility to process SCSI task regardless of the transport protocol utilized, the FET processes the received structure and creates a protocol independent SCSI control block (SCB). The SCB encapsulates a SCSI CDB with additional information needed to process the SCSI task. If SCSI task has not been received for processing, the NO branch of step F2 is followed and the SCBI awaits receipt of a SCSI task. If SCSI task has been received for processing, the YES branch of step F2 is followed to step F4.

In step F4, SCBI analyzes the SCB in order to route the structure to the appropriate processor. If SCSI task processing is required, the YES branch of step F4 is followed to step F6, in which the structure is forwarded to the processor upon which SCSI task scheduler is loaded. If SCSI task processing is not required, the NO branch of step F4 is followed to step F12, where the SCBI determines to which processing block or BET the SCB will be sent.

In step F6, the SCB is forwarded to the processor upon which the SCSI task scheduler is loaded. If the task scheduler resides on another processor, a messaging transport delivers the SCB to the local SCBI residing on that other processor. The local SCBI provides the structure to the task scheduler. If the task scheduler resides on the same processor as the FET that received the task, the SCBI provides the task scheduler the structure directly.

In step F8, the task scheduler determines whether the SCSI device server (DS) is required to process the task. If the device server is not required, the NO branch of step F8 is followed to step F12, where the SCBI determines if a storage application needs to be performed. If the device server is required, the YES branch of step F8 is followed to step F10, where the task scheduler provides the SCB to the local SCBI for routing to the DS. In order to accelerate the processing of read and write commands, most other SCSI tasks are routed to another processor to offload this processing. The SCSI commands that the device server should process is predetermined by the user and set at the initialization process.

In step F10, the SCB is forwarded to the processor upon which SCSI device server is loaded. If the device server resides on another processor, a messaging transport delivers the SCB to the local SCBI residing on that other processor. The local SCBI provides the structure to the device server. After SCSI task processing is performed, the device server provides the SCB to the local SCBI for further routing. Step F10 is followed by step F20.

In step F12, the SCBI determines to which processing block or BET the SCB will be sent. If a storage application is required, the YES branch of step F12 is followed to step F14, in which the SCBI routes the SCB to the storage application. If a storage application is not required, the NO branch of step F12 is followed to step F16, in which the SCBI determines the BET to deliver the storage command.

In step F14, SCBI routes the SCB to the processing block that performs the applicable storage application (e.g. RAID). If the processing block resides on another processor, a messaging transport delivers the SCB to the local SCBI residing on that other processor. The local SCBI provides the structure to the processing block. If the processing block resides on the same processor, the local SCBI provides the structure directly to the processing block. After storage application is performed, the processing block provides the SCB to the local SCBI for further routing. The SCB is returned to the originating block.

In step F16, SCBI determines the BET associated with the storage device to receive the SCSI task. Step F16 is followed by step F18, in which SCBI routes the SCB to the applicable BET. If the BET resides on another processor, a messaging transport delivers the SCB to the local SCBI residing on that other processor. The local SCBI provides the structure to the BET. If the BET resides on the same processor, the local SCBI provides the structure directly to the BET. The BET processes the SCB into a protocol structure used by the storage device and sends the communication over a port to a network.

Step F18 is followed by step F20, in which a response completed message is returned. The response follows the reverse routing back to the originating block. Step F20 is followed by step F2, in which the SCBI awaits another SCSI task to process.

SCSI ROUTING EXAMPLES

Examples 1–4 provide various exemplary scenarios relating to a system in which there are three processors, A, B, and C. SCBI can be executed on a multi-threaded, multi-processing, multi-processing environment. SCBI has the flexibility to allow a user to choose which processor is to perform which storage applications. In order to optimize speed and depending on the hardware architecture, it may be desired to operate certain modules on selected processors. While various routing examples are provided herein, it should be understood by those skilled in the art that SCBI can operate in a single processor environment or a multiple processor environment limited only by the amount of memory available to the system.

Example 1

Figure 6:
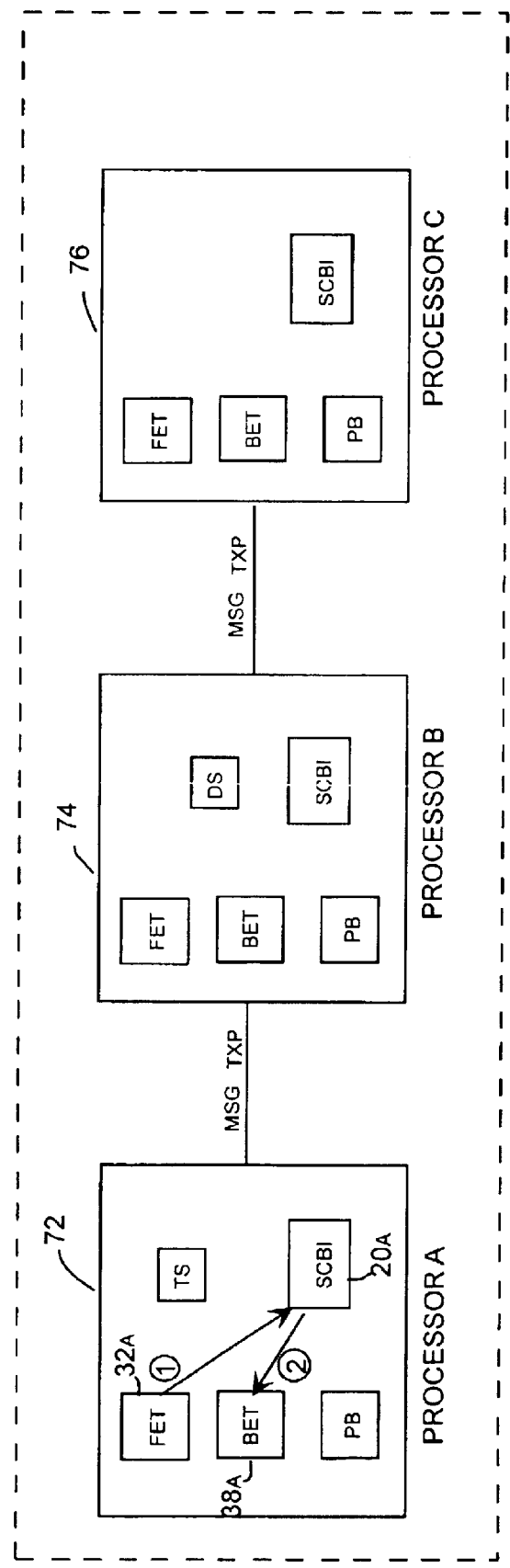
FIG. 6 is a functional block diagram illustrating an exemplary SCSI command routing without SCSI processing.

Turning now to FIG. 6, an exemplary routing within a storage device 10 of a SCSI command that does not require SCSI processing is depicted. As illustrated, a storage device 10 has three processors 72, 74, 76 for processing SCSI commands and performing storage applications. In the example, a FET 32A on processor A 72 has received a SCSI command from an external source. As previously discussed, the FET 32A converts the protocol specific structure received from the initiator into a protocol independent SCB structure.

As shown by step 1, the FET 32A passes the SCB to the SCBI central process 14A, which is located on the same processor A 72. The SCBI analyzes the structure passed from FET 32A to determine the routing. In this example, no SCSI processing or storage application processing was required. Accordingly, as shown by step 2, the SCB was simply routed to a BET 16A for delivery of the SCSI command to an external storage device. This routing may occur, for example, when the FET 32A receives a SCSI CDB in one transport protocol, such as iSCSI, and the only processing required is to convert the CDB into another protocol, such as FCP, used by a physical device.

Example 2

Figure 7:
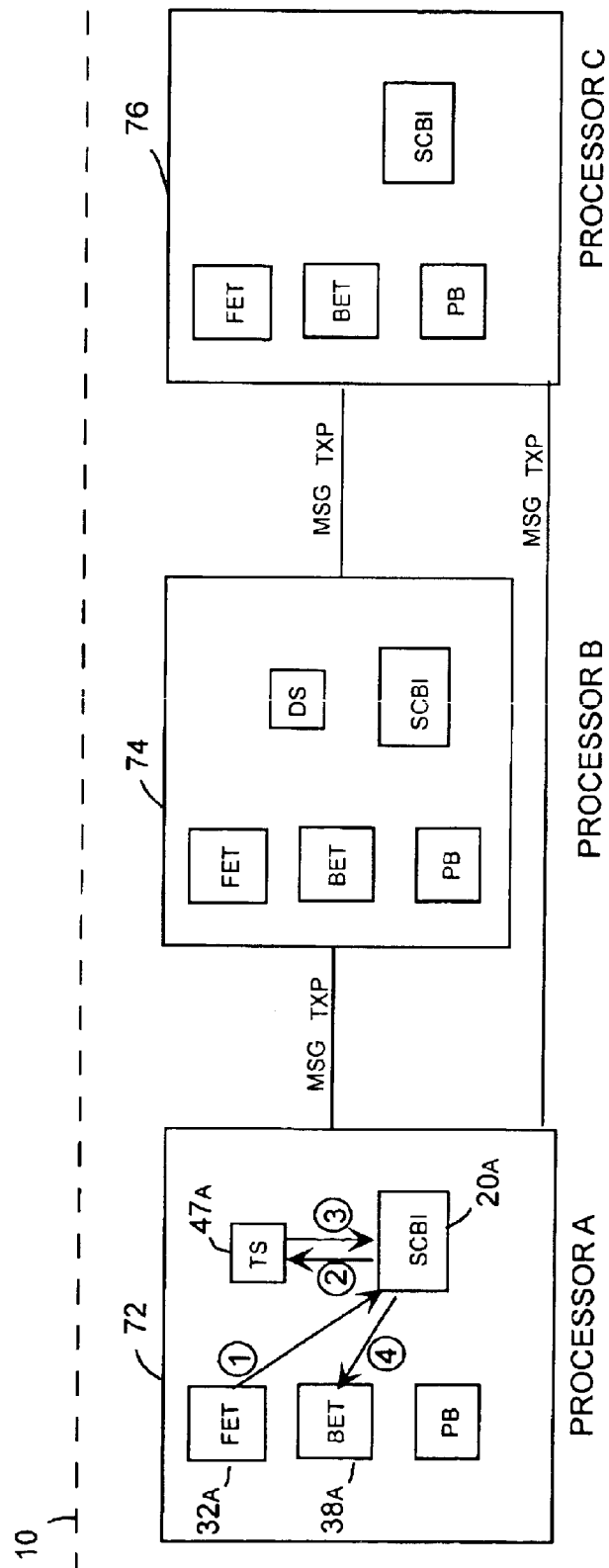
FIG. 7 is a functional block diagram illustrating an exemplary SCSI command routing with SCSI processing.

Turning now to FIG. 7, an exemplary routing within a storage device 10 of a SCSI command that requires SCSI processing is depicted. As illustrated, a storage device 10 has three processors 72, 74, 76 for processing SCSI commands and performing storage applications. In the example, a FET 32a on processor A 72 has received a SCSI command from an external source. The FET 32a converts the protocol specific structure received from the initiator into a protocol independent SCB structure.

As shown by step 1, the FET 32a passes the SCB to the SCBI central process 20a, which is located on the same processor A 72. The SCBI analyzes the structure passed from FET 32a to determine the routing. In this example, SCSI processing is required. Accordingly, as shown by step 2, the SCB is routed to the task scheduler 47a. The task scheduler 47a performs the required SCSI task. After processing by the task scheduler 47a, the SCB is passed back to the local SCBI 20a as shown by step 3. As shown by step 4, the SCB is then routed to a BET 38a for delivery of the SCSI task to an external storage device.

This exemplary routing may occur, for example, when the FET 32a receives a SCSI read or write command. A user can specify that the task scheduler quickly handles reads and write commands, while all other SCSI processing is offloaded to another processor B 74. A user can specify that the task scheduler quickly handles reads and write commands, while all other SCSI processing is offloaded to another processor B 74. In addition, the exemplary routing shown can accomplish logical unit number (LUN) remapping.

Example 3

Figure 8:
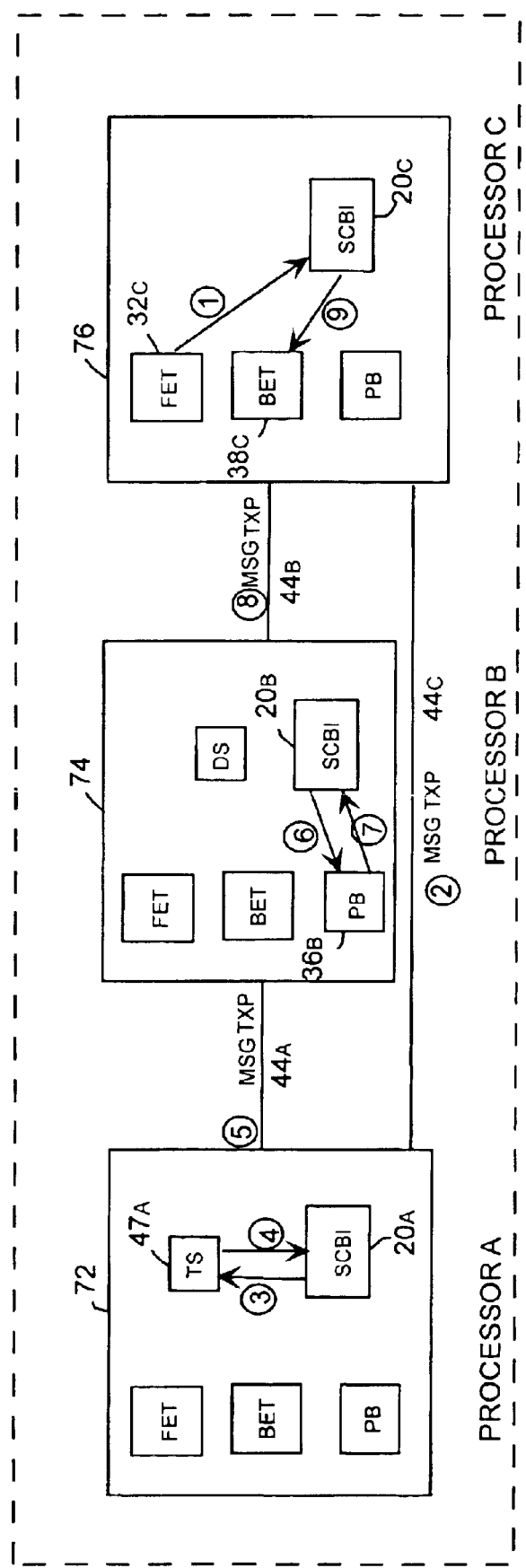
FIG. 8 is a functional block diagram illustrating an exemplary SCSI command routing with SCSI and storage application processing.

Turning now FIG. 8, an exemplary routing within a storage device 10 of a SCSI command that requires storage application processing is depicted. This exemplary routing may occur, for example, when the FET 32c receives a SCSI write command that requires RAID processing.

As illustrated, a storage device 10 has three processors 72, 74, 76 for processing SCSI commands and performing storage applications. In the example, a FET 32c on processor C 76 has received a SCSI command from an external source. The FET 32c converts the protocol specific structure received from the initiator into a protocol independent SCB structure.

As shown by step 1, the FET 32c passes the SCB to the SCBI local process 20c, which is located on the same processor C 76. The SCBI analyzes the structure passed from FET 32c to determine the routing. In this example, SCSI processing and storage application processing are required.

Accordingly, as shown by step 2, the SCB is routed via a messaging transport 44C to the processor A 72 where task scheduler 47a resides. In step 3, the SCBI 20a on processor A 72 delivers the SCB to the task scheduler 47a. The task scheduler performs the required SCSI task. After processing by the task scheduler, the SCB is passed back to the local SCBI 20a as shown by step 4. As shown by step 5, the SCB is then routed via a messaging transport 44a to a processor B 74. The local SCBI 20b on processor B receives the SCB and in step 6 passes the structure to the local processing block 36b. After the storage application processing, the SCB is returned to the local SCBI 20b as shown by step 7. In step 8, the local SCBI 20b send the SCB to processor C 76. The local SCBI 20c on processor C 76 provides the structure to the BET 38c located on this processor C 76. The BET 38c converts the received SCB into a transport specific structure for delivery to an external storage device.

Example 4

Figure 9:
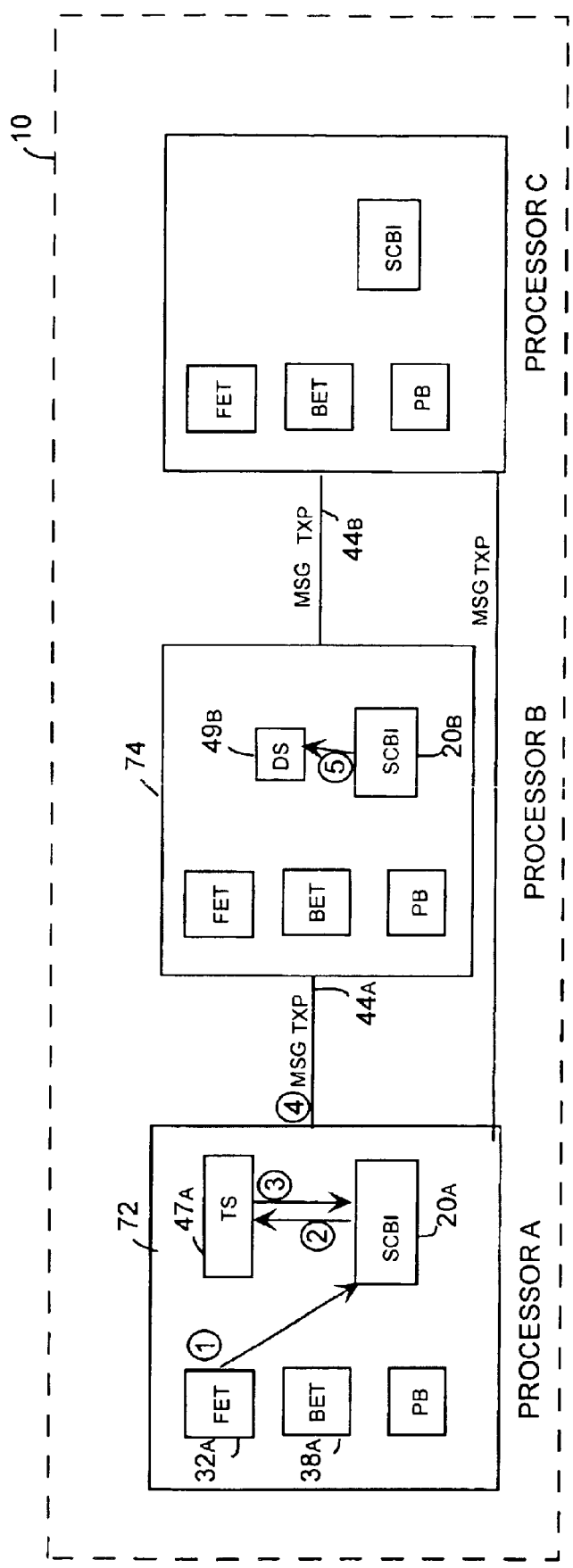
FIG. 9 is a functional block diagram illustrating an exemplary SCSI command routing with SCSI processing offloaded.

Turning now to FIG. 9, an exemplary routing within a storage device 10 of a SCSI command that requires SCSI command processing to be offloaded to another processor is depicted. As illustrated, a storage device 10 has three processors 72, 74, 76 for processing SCSI commands and performing storage applications. In the example, a FET 32a on processor A 72 has received a SCSI command from an external source. The FET 32a converts the protocol specific structure received from the initiator into a protocol independent SCB structure.

As shown by step 1, the FET 32a passes the SCB to the local SCBI 20a, which is located on the same processor A 72. The SCBI 20a analyzes the structure passed from FET 32a to determine the routing. In this example, SCSI processing is required. Accordingly, as shown by step 2, the SCB is routed to the task scheduler 47a. The task scheduler determines that the SCSI command is processed by the SCSI device server. Accordingly, the SCB is passed back to the local SCBI 20a as shown by step 3 and the SCB is then routed to a processor B 74.

Accordingly, as shown by step 4, the SCB is routed via a messaging transport 44a to the processor B where device server 49b resides. In step 5, the SCBI 20b on processor B 74 delivers the SCB to the device server 49b. The device server performs the required SCSI task. After processing by the device server, the SCB is return in the reverse path to the originating block.

This exemplary routing may occur, for example, when the FET 32a receives a SCSI command that is not a read or write that a user wants to be offloaded to another processor. For example, a SCSI command to be offloaded can include SCSI inquiry or SCSI mode sense command. In this example, the SCSI command processor 14b is acting as target emulator. The storage device 10 intercepts, processes, and returns the SCSI task without actually forwarding the command to the remote physical storage device. The storage device 10 already knows the SCSI properties of the physical device during the device registration process.

Structures and Tables

The following structures and tables described in the accompanying figures illustrate various exemplary control block structures, scatter-gather list, and tables that may be used in accordance with the present invention. However, it should be understood to those skilled in the art that various other structure formats may be used.

Turning now to FIG. 10, an interface control structure is illustrated. The SCBI control structure is the standard SCB virtual structure passed between a FET and SCBI. The interface control structure is 256 bytes in size. For this structure, format words 16–64 are not used by the calling routine. The virtual structure is defined by the following fields and accompanying descriptions:

| Field | Description |
|---|---|
| r | This bit is set to 1 if the command requires data transfers from the virtual device to the calling function. If the command does not require data transfers from the virtual device to the calling function, this bit is set to 0. |
| w | This bit is set to 1 if the command requires data transfers from the calling function to the virtual device. Otherwise this bit is 0. Note that setting both the r and w bits to 1 is not supported. |
| sdValid | This bit is set to a 1 if there is valid sense data present. |
| attrib | A 3-bit attribute field. Values are:<br>0 - SCBI_ATTRIB_UNTAGGED<br>1 - SCBI_ATTRIB_SIMPLE<br>2 - SCBI_ATTRIB_ORDERED<br>3 - SCBI_ATTRIB_HEAD_OF_QUEUE<br>4 - SCBI_ATTRIB_ACA<br>5 - reserved<br>6 - reserved<br>7 - reserved<br>If the ACA attribute is flagged, only ACA commands are allowed to be processed. These commands are error correction commands. |
| cmdType | This byte controls the command type. Standard commands are type 0x01 (SCBI_CMDTYPE_SCSI), task management functions (TMF) are type 0x02 (SCBI_CMDTYPE_TMF). |
| port | This byte holds the SCSI port identifier. |
| target | This field holds the SCSI target identifier. |
| initiatorHandle | This field holds the initiator handle. The handle is used to uniquely identify the initiator of the command for task set and access control purposes. If unique task sets per initiator or access controls are not supported, this field must be 0. |
| lun | This field holds the logical unit number (LUN) of the device to be accessed. The SCBI does not internally support hierarchical LUN addressing. |
| taskId | A 32-bit field that is used for tracking the command. Task management functions (TMFs) must reference tasks based on this value. |
| ioSize | A 32-bit field specifying the amount of data to transfer. The field is in number of bytes. |
| vdId | A 2-byte field specifying the virtual device identifier of the target/lun being addressed. |
| dataTransferred | The amount of data already received for the command, in bytes. This is only valid if the w bit is set. |
| cdb | The SCSI command descriptor block is stored here. |
| senseDataIndex | A 2-byte field specifying the index addressing the type 0 data structure that will hold any sense data. This is only valid if the sdIdxValid bit is set to 1. |
| cbId | This bit must always be set to 0. It is used to identify the structure as a SCBI_SCB structure. |
| sdIdxValid | This bit is set to a 1 if the senseDataIndex field contains a valid index. |
| virtDisk | This bit is set to a 1 if the target device requires SCSI target emulation support (i.e. SCBI will handle all non-I/O commands.) |
| vpScb | This bit is cleared to 0 for legacy reasons. |
| payloadType | A 3-bit field specifying the format of the payload contents.<br>0x0 specifies payload as a pointer to a linked list (SCBI_PAYLOAD_TYPE_LL)<br>0x1 specifies payload as a pointer to a Scatter-Gather List (SCBI_PAYLOAD_TYPE_SGL)<br>0x2 specifies payload as a pointer to a data buffer (SCBI_PAYLOAD_TYPE_DB) |
| handle | This is the handle returned from the SCBI_RegisterInterface function. It is used to determine where to return the completed commands. |
| payload | A pointer to the write data descriptor (whether data buffer, SGL, linked list, etc.) or the read buffer descriptor. The payloadType and r/w bits define the contents of this field. If no payload is specified and one is required, the calling function will be sent a general message requesting a buffer or the buffer manager will provide a buffer, depending on |

| Field | Description |
|---|---|
| | the w/r bits and whether the vdid had its allocBuffer bit set during device configuration. |
| transportId | This is an identifier of which transport supplied the groupId. This is necessary because there is no requirement that groupIds be unique across different transports. Defined values are:<br>0x0 specifies the iSCSI transport (SCBI_TRNSPRT_ID_ISCSI)<br>0x1 specifies the FC transport (SCBI_TRNSPRT_ID_FC)<br>0x3 specifies the device server transport (SCBI_TRNSPRT_ID_DS) |
| groupId | This is an identifier for grouping commands that is independent of SCSI task sets. Its value is transport dependent. |

Figure 12:
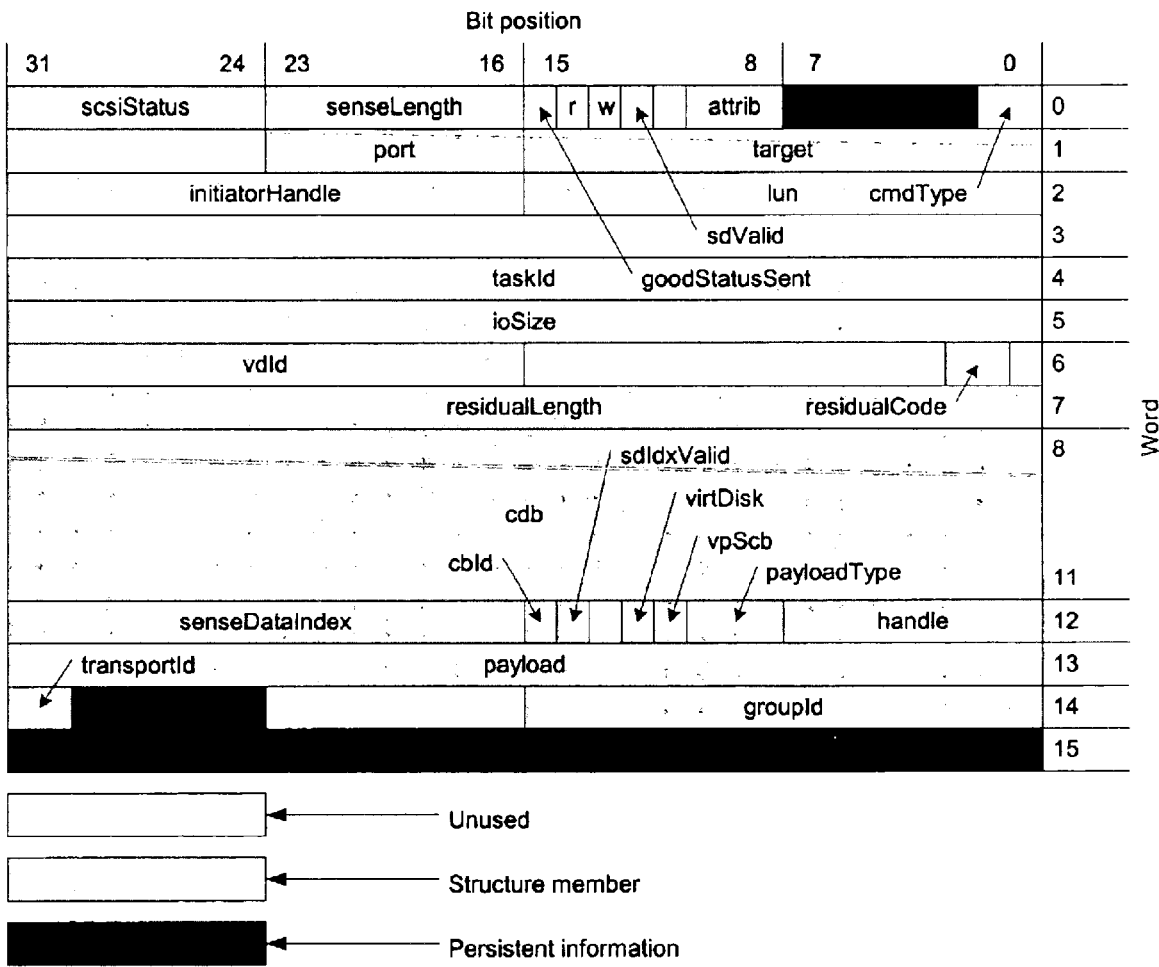
FIG. 12 is a data structure illustrating an exemplary SCSI control block interface response structure.

After completion of processing a task, the interface response structure passed between SCBI and a FET is described in reference to FIG. 12.

Figure 11:
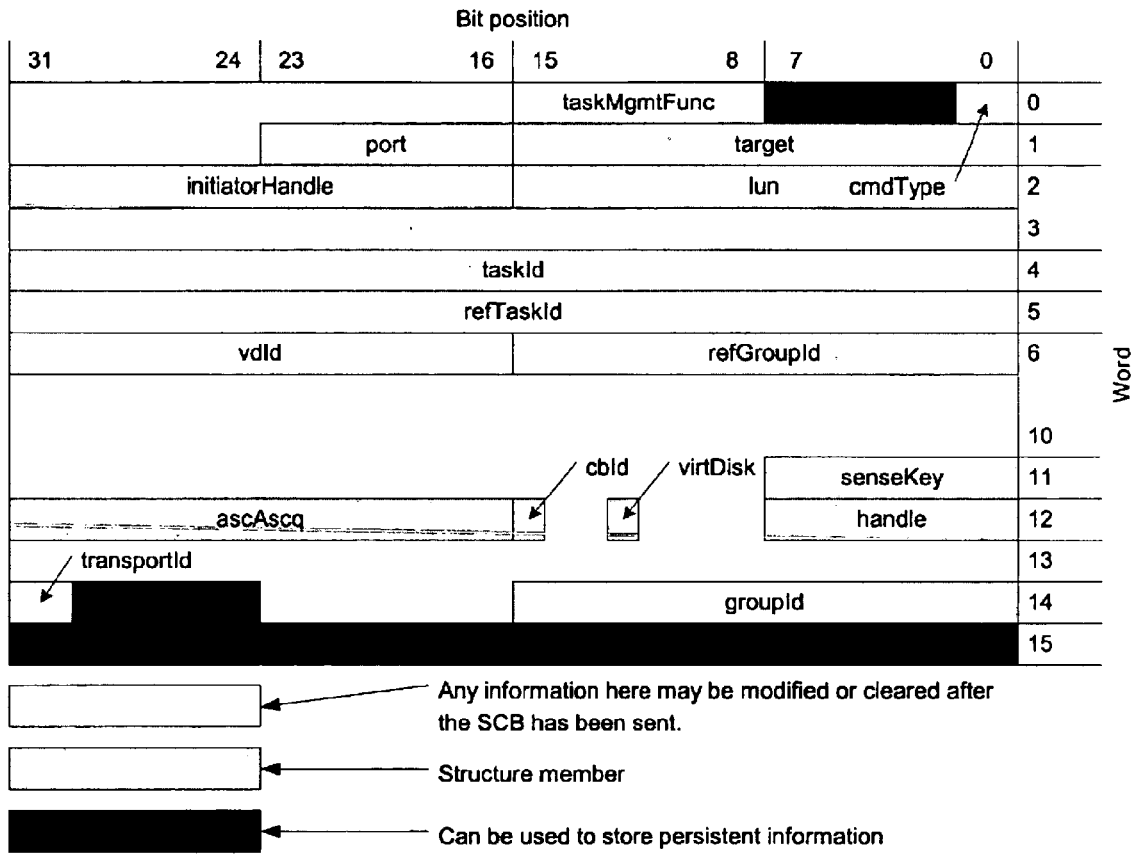
FIG. 11 is a data structure illustrating an exemplary task management function interface control structure.

Turning now to FIG. 11, a TMF interface control structure is illustrated. The TMF interface control structure is a task management function structure used for processing certain error handling SCSI tasks. For example, the task management structure function is used to abort tasks, clear task sets, and clear ACA status. These functions require additional information not present in the standard SCBI control block. As with the standard SCBI control structure, the TMF interface control structure is 256 bytes in size. For this structure, format words 16–64 are not used by the calling routine. The format of the physical structure is identical to the virtual structure. Fields that differ from the SCBI control structure defined in reference to FIG. 10 are defined as:

| Field | Description |
|---|---|
| taskMgmtFunc | This is the task management function to perform. Values for functions are defined in the header file, and include:<br>0x01 ABORT_TASK<br>0x02 ABORT_TASK_SET<br>0x03 CLEAR_ACA<br>0x04 CLEAR_TASK_SET<br>0x05 LOGICAL_UNIT_RESET<br>0x06 TARGET_RESET_WARM<br>0x07 TARGET_RESET_COLD<br>0x10 ABORT_GROUPID<br>0x11 CHANGE_GROUPID<br>where ABORT_GROUPID and CHANGE_GROUPID will only be originated by the transport blocks, and are not SCSI task management functions. |
| taskId | A 32-bit field that is used for tracking the command. |
| refTaskId | For ABORT_TASK a specific task is aborted. The taskId of the task to be aborted is supplied in this field. For CHANGE_GROUPID this field specifies the group id to change to. |
| refGroupId | For ABORT_GROUPID and CHANGE_GROUPID a set of tasks are aborted or modified. The transportId field of the TMF determines which transport id to match, and the value in this field determines whether the task should be operated on or not. |
| senseKey | A 1-byte field used to hold the sense key for some TMFs where a unit attention is required. (The SCSI unit attention condition requires that some sense key and asc/ascq value be returned upon the first access to the device by an initiator.) |
| ascAscq | A 2-byte field used to hold the additional sense code/additional sense code qualifier for use in conjunction with the senseKey field. |

Figure 13:
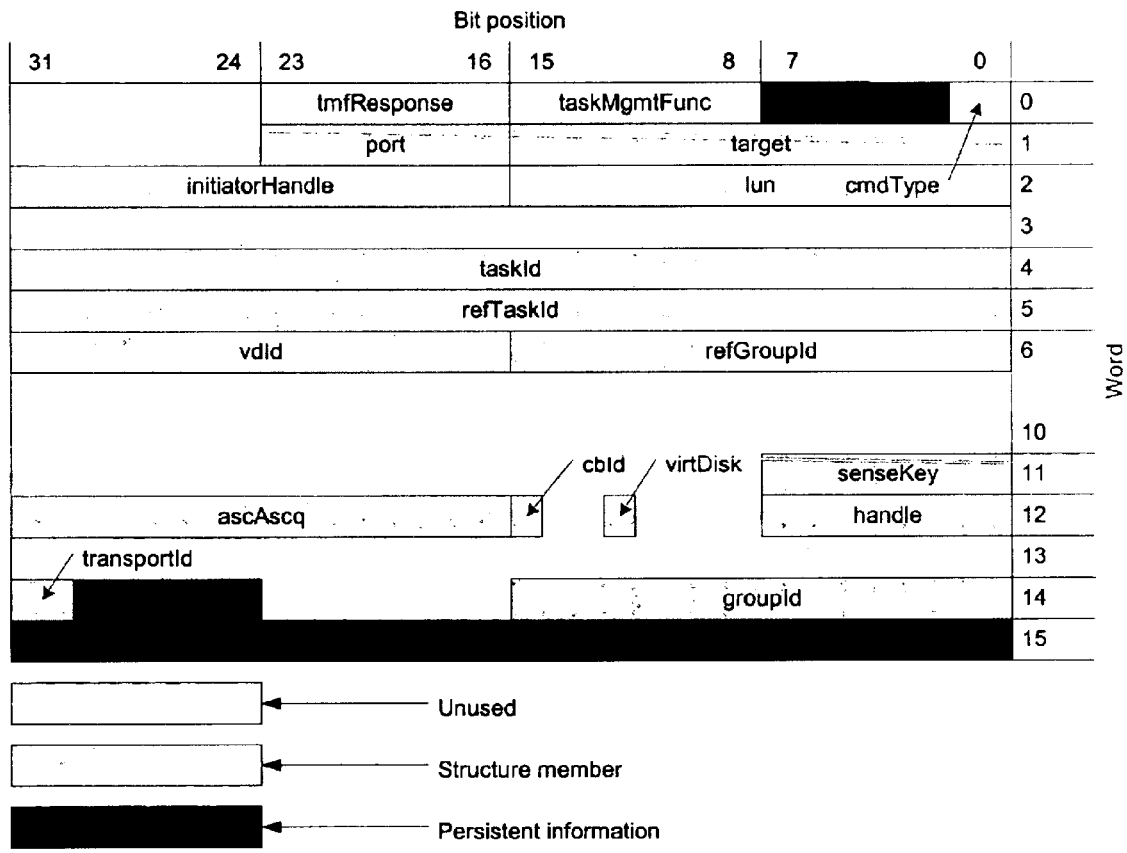
FIG. 13 is a data structure illustrating an exemplary task management function interface response structure.

After completion of processing a TMF command, the TMF interface response structure passed between SCBI and a FET is described in reference to FIG. 13.

Turning now to FIG. 12, a SCBI response structure is illustrated. The interface response structure is the structure response to a SCBI control structure. For standard commands, the returned SCBI response structure is illustrated. The interface control structure is 256 bytes in size. For this structure, format words 16–64 are not used by the calling routine. The send function format is:

void SCBI_SendCommand(pSCBI_SCB pScb);

where pScb is the control structure for the command. When a command completes, the SCB response will be returned to the callback_function supplied during registration. The callback function format is:

void callback_function(pSCBI_SCB pScb);

where pScb is the SCBI response structure for the command completed.

Any sense data will be stored in the data structure indexed via the senseDataIndex field, if provided or the CDB field. The additional fields in the structure are:

| Field | Description |
|---|---|
| scsiStatus | The SCSI completion status. (GOOD, CHECK CONDITION, ACA ACTIVE, etc.) |
| senseLength | If the sdValid bit is set, this field holds the size of the sense data. The sdIdxValid bit determines whether the sense data is available in the buffer indexed from the senseDataIndex field, or if it is located in the CDB field. If sdValid is not valid, this field will be set to 0. |
| goodStatusSent | A flag that when set to 1 shows that good status was sent previously with a SCBI_DICB structure. |
| residualCode | A value stating whether the residualLength field is valid, and if so whether its for an under run or over run condition. (0 for no residual length, 1 for underrun, 2 for overrun) |
| residualLength | If valid, the number of bytes of expected data that were not transferred due to an under run or an over run condition, depending on the residualCode value. |

The SCBI control structure is passed between a FET and SCBI after completion of most SCSI commands. However, certain error handling commands are handled by a special TMF interface control structure. A TMF interface response structure is passed between a FET and SCBI after completion of the TMF commands.

Turning now to FIG. 13, a TMF interface response structure is illustrated. The interface response structure is the structure response to a TMF interface control structure. For standard commands, the returned TMF interface response structure is illustrated. The interface control structure is 256 bytes in size. For this structure, format words 16–64 are not used by the calling routine. The response fields are:

| Field | Description |
| --- | --- |
| tmfResponse | This field holds the response code of the TMF. These are defined as:<br>0x00 SCBI_TMFR_FUNCTION_COMPLETE<br>0x01 SCBI_TMFR_TASK_DOES_NOT_EXIST<br>0x02 SCBI_TMFR_LUN_DOES_NOT_EXIST<br>0x03 SCBI_TMFR_TASK_STILL_ALLEGIANT<br>0x04 SCBI_TMFR_TASK_FAILOVER_NOT_SUPPORTED<br>0x05 SCBI_TMFR_TMF_NOT_SUPPORTED<br>0x06 SCBI_TMFR_FUNCTION_AUTHORIZATION_FAILED<br>0xFF SCBI_TMFR_FUNCTION_REJECTED |

A TMF interface response structure is passed between a FET and SCBI after completion of the TMF commands. However, after SCBI receives an interface control structure, SCBI performs certain checks to ensure that the command can be processed. SCBI adds some routing fields to the interface control structures to create a process control structure.

Figure 14:
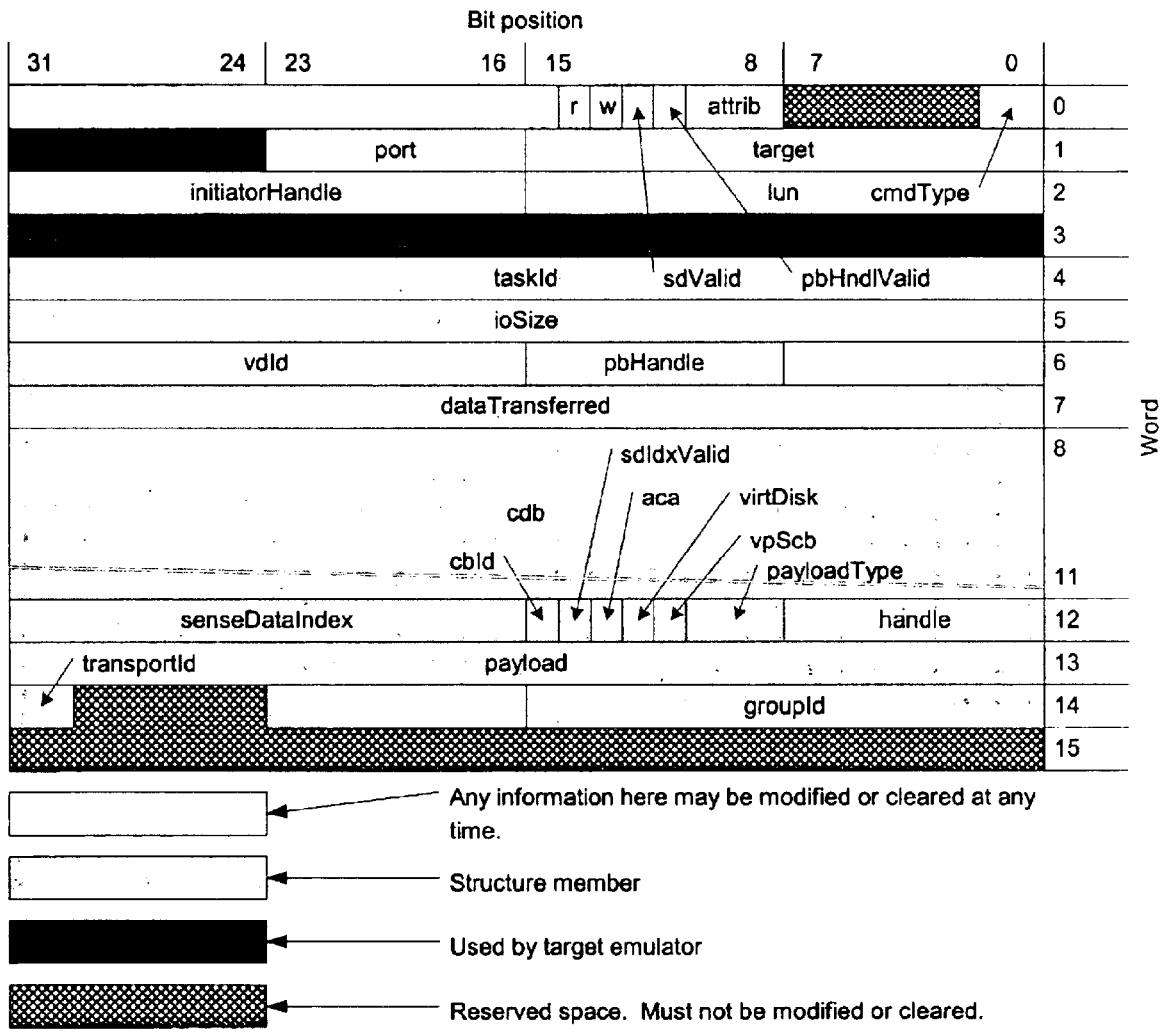
FIG. 14 is a data structure illustrating an exemplary SCSI control block processing control structure.

Turning now to FIG. 14, a SCB processing control structure is illustrated. The operations needed to process a SCB command require additional information added to the SCBI control structure. The processing control structure is 256 bytes in size. For this structure, format words 16–64 are not used by the calling routine.

When the transport sends a command to a processing block, the processing block's (*pRECEIVE_COMMAND)( ) function is called and passed the SCB. In the case of a TMF, (*pRECEIVE_TMF)( ) is called. At that point the processing block owns the structure. The SCB control structure changes after being passed to the interface. The structure during processing is illustrated. New fields for this virtual structure are defined as:

| Field | Description |
| --- | --- |
| pbHndlValid | This bit is set to a 1 if the pbHandle field should be used instead of the handle field when routing this SCB. |
| pbHandle | This is the handle returned from the SCBI_RegisterInterface function. It is used to determine where to return the completed commands if a processing block requires the I/O completion for its use prior to returning it to the original FET handle. |
| aca | This bit is used to signal that the command originally had the ACA attribute set. It is used during the I/O completion phase for SCSI queue management. |

The functions for passing the structure are:

void (*pRECEIVE_COMMAND)(pSCBI_SCB pScb); or void (*pRECEIVE_TMF)(pSCBI_SCB pScb));

where pScb is the control structure for the command.

The fields marked as persistent for the SCB Request structure are reserved when processing the structure and that byte 3 of word 1 and all of word 3 are now persistent. The purpose of these fields is to hold state information about the command and a pointer to a structure that the internal code needs to reference.

Figure 15:
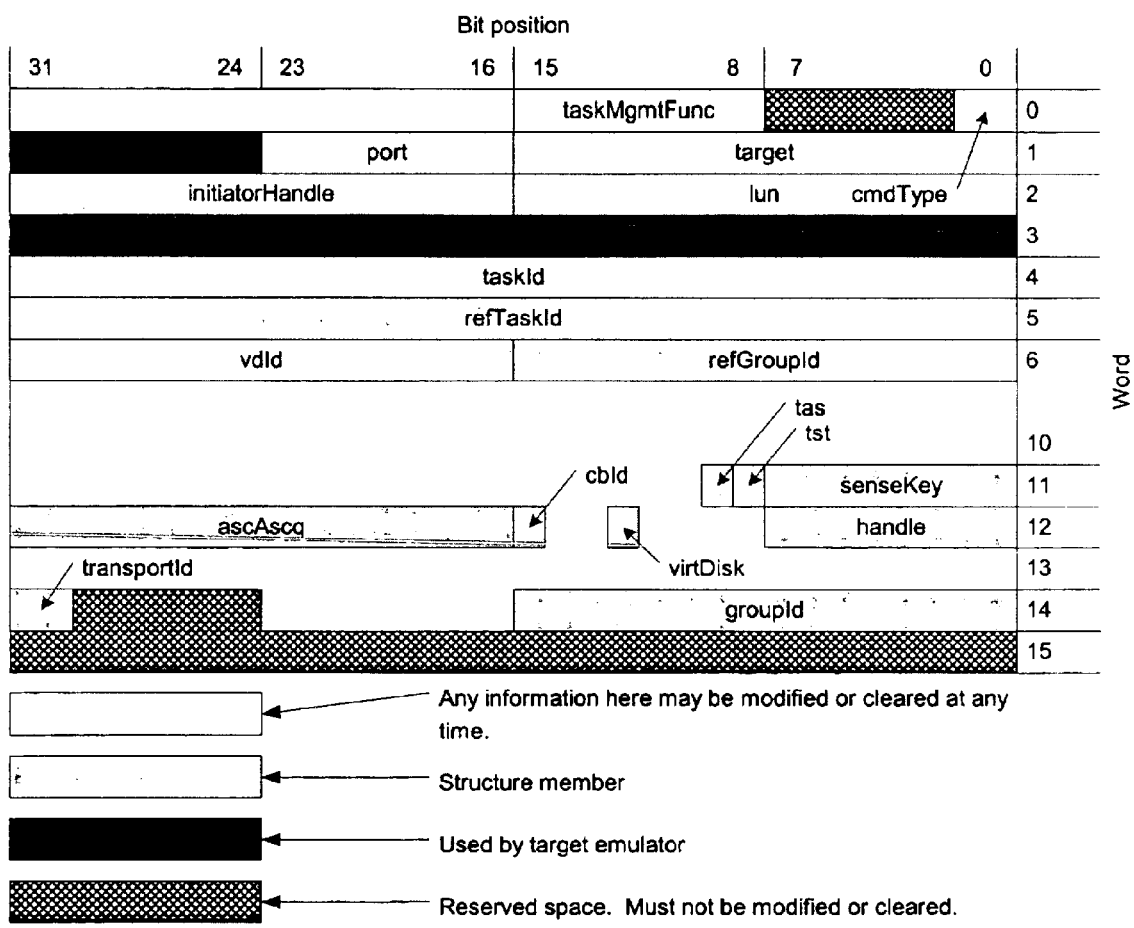
FIG. 15 is a data structure illustrating an exemplary task management function processing control structure.

Turning now to FIG. 15, a TMF processing control structure is illustrated. The TMF control structure also changes after being passed to the interface. During processing the structure is illustrated. The processing control structure is 256 bytes in size. For this structure, format words 16–64 are not used by the calling routine. The TMF structure has a definition similar to the SCB structure during processing. Previous persistent fields become reserved, and two new fields are used for state and pointer information. New fields for this virtual structure are defined as:

| Field | Description |
| --- | --- |
| tas | Used to hold the task abort status bit for use when determining whether to abort or block I/Os due to the TMF operation. |
| tst | Used to hold the task set type for use when determining whether to abort I/Os from another initiator. |

After completion of a task by a processing block or BET, a response is generated. For TMF processing control structure, a TMF processing response structure is passed. For SCB processing control structure, a SCB processing response structure is passed.

Figure 16:
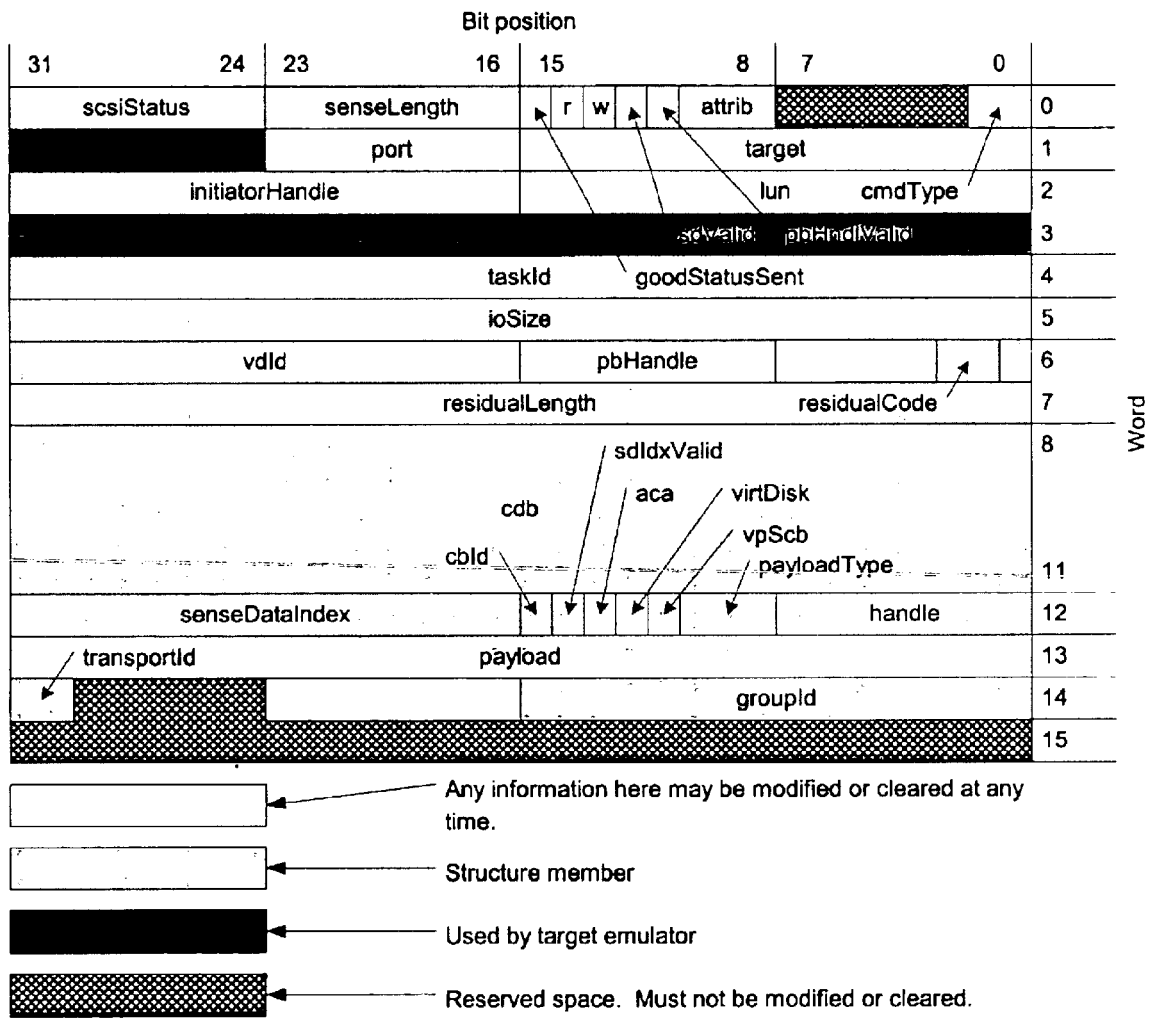
FIG. 16 is a data structure illustrating an exemplary SCSI control block processing response structure.

Turning now to FIG. 16, a SCB processing response structure is illustrated. The SCB processing response structure is the same as the interface response structure, except for the fields used by the target emulator. The processing response structure is 256 bytes in size. For this structure, format words 16–64 are not used by the calling routine. New fields for this virtual structure are defined as:

| Field | Description |
| --- | --- |
| scsiStatus | The SCSI completion status. (GOOD, CHECK CONDITION, ACA ACTIVE, etc.) |
| senseLength | If the sdValid bit is set, this field holds the size of the sense data. If sdValid is not set and/or the sense data buffer is not filled with data, this field will be set to 0. |
| goodStatusSent | A flag that when set to 1 shows that good status was sent previously with a SCBI_DICB structure. |
| residualCode | A value stating whether the residualLength field is valid, and if so whether its for an under run or over run condition. (0 for no residual length, 1 for underrun, 2 for overrun) |
| residualLength | If residualCode is set to 1 or 2, this field holds the number of bytes of expected data that were not transferred due to an under run or an over run condition, depending on the residualCode value. This field is not valid if residualCode is set to 0. |

After completion of a task by a processing block or BET, a response is generated. For SCB processing control structure, a SCB processing response structure is passed. For TMF processing control structure, a TMF processing response structure is passed.

Figure 17:
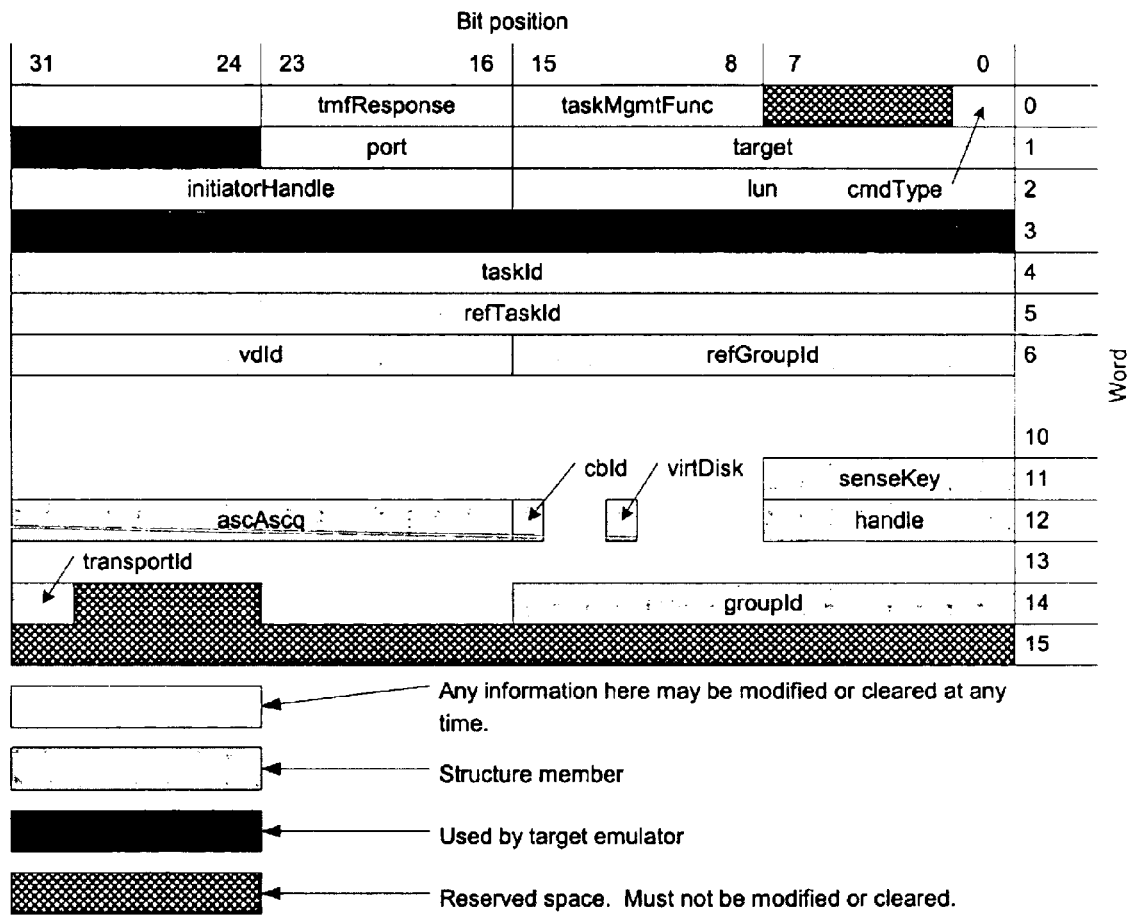
FIG. 17 is a data structure illustrating an exemplary task management function processing response structure.

Turning now to FIG. 17, a TMF processing response structure is illustrated. The TMF processing response structure is also similar as the interface response structure. The processing response structure is 256 bytes in size. For this structure, format words 16–64 are not used by the calling routine. New fields for this virtual structure are defined as:

| Field | Description |
|---|---|
| tmfResponse | This field holds the response code of the TMF. These are defined as:<br>0x00 SCBI_TMFR_FUNCTION_COMPLETE<br>0x01 SCBI_TMFR_TASK_DOES_NOT_EXIST<br>0x02 SCBI_TMFR_LUN_DOES_NOT_EXIST<br>0x03 SCBI_TMFR_TASK_STILL_ALLEGIANT<br>0x04 SCBI_TMFR_TASK_FAILOVER_NOT_SUPPORTED |

-continued

| Field | Description |
|---|---|
| | 0x05 SCBI_TMFR_TMF_NOT_SUPPORTED<br>0x06 SCBI_TMFR_FUNCTION_AUTHORIZATION_FAILED<br>0xFF SCBI_TMFR_FUNCTION_REJECTED |

For TMF processing control structure, a TMF processing response structure is passed. However, for partial payloads, two unique structures are used. A data out control block (DOCB) for write operations is described in FIG. 18 and a data in control block (DICB) for read operations are described in FIG. 19.

Turning now to FIG. 18, a DOCB structure is illustrated. The structure is 256 bytes in size. When a command being processed requires a payload or partial payload, for instance when streaming a large write I/O, the SCB's dataTransferred is compared to its ioSize. If the fields match the entire payload is present and the command may be streamed without payload requests. If the fields do not match, the payload is not entirely present and needs to be retrieved. A call to SCBI_PayloadRequest( ) will send a request to the command originator to retrieve the data specified. At a future time a response will be made to (*pGENERAL_FUNCTION)( ) with SCBI_GENFUNC_UPDATED_PAYLOAD type. There are special requirements for using this function.

There are special requirements for using this function. First, an SCBI_DOCB must be allocated, formatted, and sent. Additionally, prior to and during the SCBI_PayloadRequest( ) calls, the original SCB control structure must not be modified. Only after all requests are completed may the SCB be modified. The format for the function is:

void SCBI_PayloadRequest(pSCBI_DOCB pDocb);

where pDocb is the pointer to the SCBI_DOCB that describes the payload requested. The fields are:

| Field | Description |
|---|---|
| tag | A tag supplied by the calling function. The tag may be used for any purpose by the calling function. |
| cbId | This bit must always be set to 1 to identify this structure as a SCBI_DxCB structure. |
| errorFlag | A bit which, when set, signals that an error took place during the requested operation. |
| witeBackMode | A bit which, when set, signals that a good response should be generated for the SCB without waiting for the processing block or BET to actually finish transferring the data to the physical storage device. |
| abortFlag | A bit which, when set, signals that the SCB which generated this DOCB will be aborted at some point by the called block. |
| payloadType | The descriptor type. Defined values are:<br>0 Pointer to a linked list (SCBI_PAYLOAD_TYPE_LL)<br>1 Pointer to an SGL (SCBI_PAYLOAD_TYPE_SGL) |
| payload | A pointer to the linked list or SGL. |
| pOrigScb | A pointer to the original SCB command. |
| dataSize | The size in bytes of the requested data. |
| dataOffset | The offset of this payload within the complete data transfer. This is an offset within the initiator, not within the DOCB payload. |
| sgl | The start of the area available to store a small SGL. The number of SG elements that may be stored here is held in the SCBI_MAX_SG define. |

Bit 15 of word 12 is set to a 1. This allows differentiation of the structure from an SCB. Also, repeated requests of payload must be in the order that the data would be received. This function does not support out of order data requests. Finally, the dataSize and dataOffset fields will not be preserved; if that information is needed, it must be stored elsewhere (such as in the processing block's space in the original SCB).

The expected order of events for requesting a payload is as follows. The calling routine allocates an SCBI_DOCB. The payload pointer, pointer type, size of the requested payload, data offset (if needed), and pointer to the original command are filled in the SCBI_DOCB. If the pointer type is to an SGL, some or all of the SGL can be put into the payload SGL region. The call to SCBI_PayloadRequest is made. Some time later (*pGENERAL_FUNCTION)( ) is called with SCBI_GENFUNC_UPDATED_PAYLOAD type. At this point the SCBI_DOCB and buffer used may be freed or reused.

There is a section in the SCBI_DOCB structure that has space for a small SGL. The calling routine can use this space if desired to avoid having to allocate another structure. The number of elements available can be obtained from the SCBI_MAX_SG define. If there is not enough room available, the last element in the space can be used to chain to another buffer containing more SG entries.

During partial payloads operations, two unique structures are used. The data in control block (DICB) for read operations is described in FIG. 19.

Turning now to FIG. 19, a DICB structure is illustrated. The structure is 256 bytes in size. When a command being processed requires some payload be sent back to the host as it is being received, for instance when streaming a large read I/O, the following method can be used to send out portions of the payload. A call to SCBI_PayloadSend( ) will send a request to the command originator to transmit the data specified. At a future time a response will be made to (*pGENERAL_FUNCTION)( ) with SCBI_GENFUNC_UPDATED_PAYLOAD type signaling that the data was sent. There are special requirements for using this function similar to the SCBI_PayloadRequest( ) function. First an SCBI_DICB must be allocated, formatted, and sent. Additionally, prior to and during the SCBI_PayloadSend( ) calls, the original SCB control structure must not be modified. Only after all requests are completed may the SCB be modified. The format for the function is:

void SCBI_PayloadSend(pSCBI_DICB pDicb);

where pDicb is the pointer to the SCBI_DICB that describes the payload to send requested.

The SCBI_DICB structure is defined as shown in FIG. 19. The fields are similar to the SCBI_DOCB structure. The data descriptor applies to the payload to send. The new fields are as follows:

| Field | Description |
| --- | --- |
| ackFlag | A bit which, when set, signals that a response is needed. When the bit is cleared, the SCBI_DICB structure and data buffers will be freed and no response will be returned. |
| goodStatus | A bit that tells the transport to send good status immediately after the data is through being transferred, without waiting for the SCB response to arrive. |
| lastDataXfer | A bit that tells the transport that this is the last data transfer needed for the I/O. |

The expected order of events for sending a partial payload is as follows. The calling routine allocates an SCBI_DICB. The payload pointer, pointer type, size of the payload to send, offset into the payload buffer to start sending data from (if needed), and pointer to the original command are filled in the SCBI_DICB. If the pointer type is to an SGL, some or all of the SGL can be put into the payload SGL region. The flag bits are set based on whether the DICB needs to be returned, if this is the last data transfer, and whether good status needs to be sent back or not. The call to SCBI_PayloadSend is made. Some time later (*pGENERAL_FUNCTION)( ) is called with SCBI_GENFUNC_UPDATED_PAYLOAD type. At this point the SCBI_DICB and buffer used may be freed or reused. The SCBI_DICB has a space available for an SGL, exactly like the SCBI_DOCB structure. A SGL entry is described in reference to FIG. 20.

Turning now to FIG. 20, an exemplary scatter-gather list (SGL) structures is illustrated. For an SGL type the payload field points to an SGL. The fields are:

| Field | Description |
| --- | --- |
| ppcb | A flag determining special characteristics of this element. Defined values are: 0x00 Normal SG element (SCBI_SGL_PPCB_NORMAL_ELEM) 0x02 Final SG element in the list (SCBI_SGL_PPCB_FINAL_ELEM) 0x04 Current element should not be automatically freed. This is necessary in cases where the element is pointing to memory not allocated by support routines defined outside the scope of SCBI. (SCBI_SGL_PPCB_DONT_FREE) 0x40 Element is a chain. The elementAddress field points to the next SG element. (SCBI_SGL_PPCB_CHAIN_ELEM) |
| elementLength | The total size of the data addressed by the SG element, in bytes. This field is not used if the element is a chain pointer. |
| elementAddress | A physical pointer to the data or, if a chain element, a physical pointer to the next SG element. |

Normal, final and don't-free header values may also be or'd together in any combination. The chain value may not be used with any of the other values.

Turning now to FIG. 21, an exemplary routing table entry is illustrated. The routing table is composed of multiple copies of the routing table entry and indexed by vdId. A separate copy of the table is kept for each processor on the system. The fields for the tables are defined as follows:

| Field | Description |
| --- | --- |
| qid | The queue identifier that tells SCBI where to send the command or responses. For a multi processor environment the qid is checked against the local processor. If different, the SCB is passed to the proper processor. If the same, a lookup is done in the interface list table to determine the function pointer to use to pass the SCB to. |
| ordHoq | This is a counter used by the task scheduler to keep track of the number of ordered and head-of-queue SCSI commands that have been sent to the device with the vdId. The counter value determines when a new command may be issued to the device and is governed by the SCSI protocol. |
| ordqd | This is a counter used by the task scheduler to keep track of the number of ordered that have been queued to the device with the vdId. The counter value determines when a new command may be issued to the device and is governed by the SCSI protocol. (see untagged, ordHoq and count below for other related fields) |
| untagged | A counter similar to the ordHoq counter and used the same way for tracking untagged commands. (see ordHoq, ordqd and count for other related fields) |

-continued

| Field | Description |
|---|---|
| aca | This flag determines if an aca command is in operation on the device currently or not. Only one aca command may be in use at any time. |
| allocBuffer | This flag tells SCBI whether the processing block/back end transport for this device requires SCBI to fully specify the databuffers ahead of time or not. If 1, SCBI allocates/fills the buffers. |
| virtDisk | This flag tells SCBI whether to use the SCSI target emulator for this device or instead just pass all SCSI commands to the device. If 1, SCBI handles all non-read/write commands. If 0, all SCSI commands are passed to the device. |
| receiveHandle | This is the receive handle of for the processing block/BET which registered the vdId. It is only valid on the processor which registered the vdId and is used as the index into the interface list table when looking up function pointers (see the qid field above). |
| count | This counter tracks the number of I/Os currently sent to the device. Its used in conjunction with the ordHoq, ordqd and untagged fields above to determine when a new command may be passed forward. |
| queueFrozen | This field determines if all new commands to the device should be returned with the SCSI_BUSY status. It acts as a counter —any new queue freeze command increments the count, all unfreeze commands decrement it. When the counter is zero, commands are allowed to pass in. When non-zero, all new commands are returned with busy status. |
| head | This is the head pointer for the command queue for this device. When I/Os are not allowed into the device due to ordering rules (ordHoq, ordqd, untagged, count fields above) they are put on this queue. As new commands may be issued to this device they are pulled off the head. Commands that need to be queued are placed on the tail (see tail below). |
| tail | This is the tail pointer for this devices command queue. (see head above for info). |

Turning now to FIG. 22, an exemplary interface table entry is illustrated. The interface list table is composed of interface list structure entries, one entry for each FET/processing block/BET registered with SCBI on the local processor. A separate copy of the table is kept for each processor on the system and only applies to its local processor. All fields of the interface list contain function pointers used by SCBI to route commands or responses. The index for the table is the FET/processing block/BET's handle given to it by the response to the registration call, and is determined by SCBI from the routing table.

| Field | Description |
|---|---|
| cmdCallBack | This function pointer is used to pass responses to. It is valid for FETs and processing blocks, and not used by BETs. |
| receiveCmd | This function pointer is used to pass commands to (not TMFs however). It is valid for processing blocks and BETs, and not use by FETs. |

-continued

| Field | Description |
|---|---|
| receiveTmf | This function pointer is used to pass TMFs to. It is valid for all FETs, processing blocks, and BETs. |
| genCallBack | This function pointer is used to pass general information, such as the registered handle, signals that the device configuration has been updated, and responses to DOCBs and DICBS when appropriate. It is valid for all FETs, processing blocks, and BETs. |

Turning now to FIG. 23, an exemplary virtual device list is illustrated. The virtual device list is passed to SCBI by processing blocks and BETs and contains information about which devices those entities will control. The list is composed of a header that contains information general to all the entries, followed by one entry per device the block will control. The information from this list is used to update the local processors routing table, the task scheduler's routing table, and the logical unit block structures. The virtual device list defines:

| Field | Description |
|---|---|
| numEntries | This holds a count of the number of vdId/size pairs in the list. |
| qid | This is the qid of the local processor that runs the processing block/BET. The manner in which the processing block/BET acquires this number is not defined in SCBI. |
| virtDisk | This flag tells SCBI whether the processing block/BET can handle all SCSI commands or just normal I/O. If 1, only normal I/O may be sent. If 0, all SCSI commands must be sent. |
| allocBuffer | This flag tells SCBI whether the processing block/BET requires data buffers to be fully specified prior to receiving a command. If 1 then the buffers must be specified before a command may be sent. |

-continued

| Field | Description |
|---|---|
| handle | This is the handle that is used to lookup the device's function pointers in the interface list, and is the handle returned to the processing block/BET during its registration. |
| vdId | This field contains the vdId used to access a device on the processing block/BET. Each entry contains this field and a corresponding size field. |
| size | This field holds the size of the device in blocks. |

Turning now to FIG. 24, an exemplary logical unit block table entry is illustrated. The logical unit block table is composed of individual structures, one structure per device sent via the virtual device lists from the processing blocks/BETs. It contains information necessary for use by SCBI in implementing the SCSI protocol. Many of the fields apply strictly to SCSI, and will only be identified in a general way to their purpose for that protocol. The logical unit block tables defines:

| Field | Description |
|---|---|
| nextTargetLu | This contains a pointer to the next logical unit block belonging to this target. It is used with certain SCSI TMFs that apply to all logical units on a target. |
| prevTargetLu | This contains a pointer to the previous logical unit block belonging to this target. |
| vdId | This holds the vdId used to reference this logical unit. |
| target | This holds the target number that this logical unit belongs to. |
| lun | This holds the logical unit number that applies to this logical unit. |
| qerr | This holds queue error setting for this logical unit. The qerr value tells SCSI how to deal with I/Os sitting on the command queue or in the process of being executed when a check condition occurs. |
| tst | This holds the value of the task set type flag. It is used to specify whether all commands to the logical unit belong to a single task set, or if the commands are grouped into individual task sets, one set per initiator communicating with the logical unit. Task sets are only needed for some TMFs. |
| rdy | This holds a flag signifying whether the logical unit is ready to be accessed. |
| virtDisk | This flag determines whether the logical unit supports all SCSI commands or just normal I/Os. |
| allocBuffer | This flag determines whether the logical unit requires that data buffers be fully specified prior to being issued a command. |
| tas | This holds the value of the task abort status flag. It is used to specify how commands should be aborted when a check condition occurs (or even whether to abort them). Its exact meaning is based on the value in the qerr field above, and is defined by the SCSI protocol. |
| uaInterlock | This holds the value of the UA (unit attention) interlock. It is used only for CA (contingent allegiance) and ACA (auto-contingent allegiance) conditions, and defined by the SCSI protocol. |
| qid | This holds a count of the number of vdId/size pairs in the list. |
| unitAttentionCondition | This holds the value for the unit attention condition in effect. UA values are defined by the SCSI protocol. |
| unitAttentionPending | Each bit in this field applies to one initiator and specifies whether a UA is pending for that initiator or not. As each word (4 bytes) is 32 bits in size, this field will increase in size by 1 word for every 32 initiators SCBI must support. The number of initiators supported is defined when the program is compiled. |
| initiatorFaultList | This determines whether a CA or ACA condition is in progress. The stateList field determines the actual fault condition. |
| stateList | The current state for the logical unit with respect to each initiator is held in this field. Two bits are used per initiator, and signify whether the initiator is in a normal state, CA state, or ACA state. As with the unitAttentionPending field, each word of this field can support 16 initiators, and the field will increase in size by 1 word for every additional 16 initiators that SCBI must support. |

-continued

| Field | Description |
|---|---|
| acaTaskPending | Each bit in this field applies to one initiator and specifies whether a ACA command from that initiator is currently in progress on the logical unit. It increases in size exactly as the unitAttentionPending field above. |
| acaTask | This is the head of the queue used to hold incoming commands when an ACA condition is in progress. |
| acaTaskTail | This is the tail of the queue used to hold incoming commands when an ACA condition is in progress. |
| capacity | This holds the size of the logical unit, in blocks. |
| vendorId | This holds the vendor identification string used with the SCSI Inquiry command. The setting of this field is not defined by SCBI. |
| productId | This holds the product identification string used with the SCSI Inquiry command. The setting of this field is not defined by SCBI. |
| productRev | This holds the product revision string used with the SCSI Inquiry command. The setting of this field is not defined by SCBI. |
| resInitiatorHndl | This bit field determines whether a particular initiator has made a reservation with the logical unit before or not. If the field contains a valid initiator handle (not FFFF hex) then only that initiator may communicate with the logical unit. Other initiators attempting to communicate with it will be returned a special check condition notifying them that the logical unit has been reserved. Only a small number of commands may be issued to a reserved logical unit from another initiator, as defined by the SCSI protocol. |

In sum, SCSI control block interface (SCBI) is an API and related structures that handles the routing issues between modules that receive, process, and deliver the storage I/O. As a result, knowledge of the underlying routing implementation is not required by the modules to perform their functions. SCBI defines a method to pass SCSI commands and task management functions between transports and processing blocks without the need for modules to have knowledge of the protocols used by other modules. Instead, only interface calls and callbacks are necessary for I/O processing. These blocks can use the interface without requiring knowledge of the underlying hardware and allow the interface to determine the best method of passing commands. In addition, the SCBI provides the flexibility to allow users to assign processing functions to whichever processor that will make the most sense for their particular application.

According to an aspect of the invention, a storage application device receives a SCSI control block from a front end transport and determines a storage command associated with the SCSI control block. Based upon the storage command, a particular processor that processes the storage command is determined from a plurality of processors within the storage application device. Each of processors is operable for processing operations on storage I/O or data storage management operations on the storage I/O. Accordingly, in the storage device, each of the plurality of processors is operable for processing storage commands and the particular processor is selected by a user. The SCSI control block is routed to the particular processor for processing the storage command. After processing, the SCSI control is routed block to a back end transport.

In accordance with another aspect, the front end transport translates a transport protocol structure into the SCSI control block. The front end transport includes a multi-protocol high speed data interface component for receiving and transmitting storage I/Os formatted as data packets in a data transport protocol. The SCSI control block contains a SCSI command descriptor block containing the storage command. The storage command can be a SCSI command or a task management function. After receiving the SCSI control block, the back end transport translates the SCSI control block into a transport protocol for delivery over a network. Similarly, the back end transport includes a multi-protocol high speed data interface component for receiving and transmitting storage I/Os formatted as data packets in a data transport protocols. For Ethernet networks, the transport protocol can include iSCSI protocol, FCIP protocol, FCP protocol, and other transport protocols.

In accordance with another aspect of the invention, the storage application device includes a front end transport that is operable to translate a transport protocol structure into a transport independent SCSI control block. The front end transport interfaces with a SCSI control block interface that is operable to receive the SCSI control block from the front end transport and determine a storage command associated with the SCSI control block. After which, the storage control block interface determines a particular processor that processes the storage command from a plurality of processors.

During an earlier registration process, the storage control block interface previously determined which storage command processing is associated with each of the processors. A storage command is a typically SCSI command or a task management function. A messaging transport is used to route the storage control block to the particular processor and the storage control block interface is not dependent on the architecture of the messaging system. A back end transport translates the SCSI control block into a transport protocol structure. The SCSI control block interface is not dependent on a hardware architecture of any specific storage application device.

In accordance with yet another aspect of the invention, the SCBI receives registration calls from a plurality of processors. A send command function passes a SCSI control block from a front end transport whereby SCBI determines a storage command associated with the SCSI control block.

Based upon the registration calls, the SCBI determines a particular processor that processes the storage command from the plurality of processors and routes the SCSI control block to the particular processor to process the storage command. After processing, a response is generated and routed back to the originating block.

In yet another aspect, SCBI determines a storage command associated with the SCSI control block. Based upon the storage command, a particular processor that processes that the storage command is determined. However, other storage commands can be processed on a different processor. For examples SCSI read and write commands can be processed on one processor while all other SCSI command and task management functions can be performed on other processors. A user can set which processor performs which command or task management processing.

In yet another aspect of the invention, SCBI includes an application program interface (API) for passing SCSI commands between transports and processing blocks. The application program interface includes a registration function for registering of a plurality of transports and processing blocks, a send command function for passing SCSI commands and task management functions, send device list function for creating and updating tables associated with processing SCSI commands, a return response function for providing a response back to an originating block after completion of processing the SCSI commands, and a return task management function for providing a response back to an originating block after completion of processing the SCSI commands.

In another aspect, the API includes payload updated function to return a payload structure back to the calling block, a payload request buffer function to request buffers for receiving data, and a payload request function to request data from a transport.

In yet another aspect, the API includes a module initialization function to return back function pointers if a block requires pointers instead of making absolute calls.

In view of the foregoing, it will be appreciated that the present system provides a distributed SCSI command processing system. It should be understood that the foregoing relates only to the exemplary embodiments of the present invention, and that numerous changes may be made therein without departing from the spirit and scope of the invention as defined by the following claims. Accordingly, it is the claims set forth below, and not merely the foregoing illustrations, which are intended to define the exclusive rights of the invention.

The invention claimed is:

1. A method for processing storage data within a storage application device comprising the steps of:

receiving a SCSI control block from a front end transport;

determining a storage command associated with the SCSI control block;

based upon the storage command, determining a particular processor that processor that said storage command from a plurality of processors within the storage application device, wherein each of the plurality of processors are operable for processing storage commands and the particular processor is selected by a user;

routing the SCSI control block to the particular processor;

processing the storage command; and routing the SCSI control block to a back end transport.

2. The method of claim 1 wherein the SCSI control block contains a SCSI command descriptor block.

3. The method of claim 1 wherein the storage command is a SCSI command or a task management function.

4. The method of claim 1 wherein the front end transport translates a transport protocol structure into the SCSI control block.

5. The method of claim 4 wherein the transport protocol is iSCSI protocol.

6. The method of claim 4 wherein the transport protocol is FCP protocol.

7. The method of claim 1 wherein the back end transport translates the SCSI control block into a transport protocol.

8. The method of claim 7 wherein the transport protocol is iSCSI protocol.

9. The method of claim 7 wherein the transport protocol is FCP protocol.

10. The method of claim 1 wherein the front end transport includes a multi-protocol high speed data interface component for receiving and transmitting storage I/Os formatted as data packets in one of a plurality of data transport protocols.

11. The method of claim 1 wherein the back end transport includes a multi-protocol high speed data interface component for receiving and transmitting storage I/Os formatted as data packets in one of a plurality of data transport protocols.

12. The method of claim 1 wherein the plurality of processors are operable for processing operations on storage I/O or data storage management operations on the storage I/O.

13. A method for processing storage data comprising the steps of:

determining a determined storage command associated with the SCSI control block;

based upon the storage command, determining a particular processes that processor that said storage command from a plurality of processors within the storage application device, wherein other storage commands are processed on a different processor;

routing the SCSI control block to the particular processor;

processing the storage command; and routing the SCSI control block to a back end transport.

14. The method of claim 13 wherein the storage command is a SCSI command or a task management function.

15. The method of claim 13 wherein the plurality of processors are operable for processing operations on storage I/O or data storage management operations on the storage I/O.

16. The method of claim 13 wherein said storage command is a SCSI read or a SCSI write command.

17. The method of claim 13 wherein said other storage commands are any SCSI command or task management function that is not a SCSI read or a SCSI write command.

* * * * *